US007788251B2

(12) United States Patent
Carlson et al.

(10) Patent No.: US 7,788,251 B2
(45) Date of Patent: Aug. 31, 2010

(54) SYSTEM, METHOD AND COMPUTER PROGRAM PRODUCT FOR CONCEPT-BASED SEARCHING AND ANALYSIS

(75) Inventors: Robert John Carlson, Lovettsville, VA (US); Charles Andrew Clarkson, Ponte Vedra Beach, FL (US); Sherif A. Elfayoumy, Jacksonville, FL (US); Rengaswamy Mohan, Jacksonville, FL (US); Usha Mohan, Jacksonville, FL (US); Spripriya Mukundan, Kendall Park, NJ (US)

(73) Assignee: IxReveal, Inc., Jacksonville, FL (US)

( * ) Notice: Subject to any disclaimer, the term of this patent is extended or adjusted under 35 U.S.C. 154(b) by 515 days.

(21) Appl. No.: 11/548,456

(22) Filed: Oct. 11, 2006

(65) Prior Publication Data

US 2008/0065603 A1 Mar. 13, 2008

Related U.S. Application Data

(60) Provisional application No. 60/724,914, filed on Oct. 11, 2005.

(51) Int. Cl.
   *G06F 17/30* (2006.01)
(52) U.S. Cl. .................................... 707/707
(58) Field of Classification Search .......... 707/3, 707/4, 10
   See application file for complete search history.

(56) References Cited

U.S. PATENT DOCUMENTS 4,839,853 A    6/1989    Deerwester et al.

| 5,278,980 | A | 1/1994 | Pedersen et al. |
| 5,295,256 | A | 3/1994 | Bapat |
| 5,418,951 | A | 5/1995 | Damashek |
| 5,488,725 | A | 1/1996 | Turtle et al. |
| 5,519,865 | A | 5/1996 | Kondo et al. |
| 5,555,408 | A | 9/1996 | Fujisawa |
| 5,592,667 | A | 1/1997 | Bugajski |
| 5,617,578 | A | 4/1997 | Kroll et al. |
| 5,619,709 | A | 4/1997 | Caid et al. |
| 5,634,051 | A | 5/1997 | Thomson |
| 5,727,950 | A | 3/1998 | Cook et al. |

(Continued)

FOREIGN PATENT DOCUMENTS

GB          2399666 A        9/2004

(Continued)

OTHER PUBLICATIONS

International Search Report for International Application No. PCT/US06/39511, mailed Apr. 25, 2007, 3 pages.

(Continued)

*Primary Examiner*—Baoquoc N To

(57) ABSTRACT

Systems, methods, and computer programs for performing concept-based searches and for creating content are described. According to one embodiment, a method is described wherein one or more concepts are identified and a search query is formed based on the identified concepts. The search query is used to perform one or more searches that retrieve one or more search results. According to another embodiment, a method is described wherein one or more concepts are identified in a first content source. Context related to at least one of the one or more concepts is extracted from the first content source, and a second content source is populated with at least a portion of the context.

17 Claims, 17 Drawing Sheets

U.S. PATENT DOCUMENTS

| | | | |
|---|---|---|---|
| 5,761,496 A | 6/1998 | Hattori |
| 5,768,578 A | 6/1998 | Kirk et al. |
| 5,794,178 A | 8/1998 | Caid et al. |
| 5,819,260 A | 10/1998 | Lu et al. |
| 5,832,182 A | 11/1998 | Zhang et al. |
| 5,832,470 A | 11/1998 | Morita et al. |
| 5,867,799 A | 2/1999 | Lang et al. |
| 5,884,305 A | 3/1999 | Kleinberg et al. |
| 5,920,864 A | 7/1999 | Zhao |
| 5,924,090 A | 7/1999 | Krellenstein |
| 5,926,811 A | 7/1999 | Miller et al. |
| 5,933,822 A * | 8/1999 | Braden-Harder et al. ........ 707/5 |
| 5,983,214 A | 11/1999 | Lang et al. |
| 5,987,446 A | 11/1999 | Corey et al. |
| 5,987,447 A | 11/1999 | Chang et al. |
| 6,006,221 A | 12/1999 | Liddy et al. |
| 6,026,388 A | 2/2000 | Liddy et al. |
| 6,028,605 A | 2/2000 | Conrad et al. |
| 6,029,161 A | 2/2000 | Lang et al. |
| 6,038,561 A | 3/2000 | Snyder et al. |
| 6,055,526 A | 4/2000 | Ambroziak |
| 6,078,924 A | 6/2000 | Ainsbury et al. |
| 6,101,491 A | 8/2000 | Woods |
| 6,101,492 A | 8/2000 | Jacquemin et al. |
| 6,101,515 A | 8/2000 | Wical et al. |
| 6,122,628 A | 9/2000 | Castelli et al. |
| 6,182,063 B1 | 1/2001 | Woods |
| 6,189,002 B1 | 2/2001 | Roitblat |
| 6,195,657 B1 | 2/2001 | Rucker et al. |
| 6,199,034 B1 | 3/2001 | Wical |
| 6,199,067 B1 | 3/2001 | Geller |
| 6,233,575 B1 | 5/2001 | Agrawal et al. |
| 6,236,987 B1 | 5/2001 | Horowitz et al. |
| 6,256,633 B1 | 7/2001 | Dharap |
| 6,263,335 B1 | 7/2001 | Paik et al. |
| 6,289,382 B1 | 9/2001 | Bowman-Amuah |
| 6,300,957 B1 | 10/2001 | Rao et al. |
| 6,308,175 B1 | 10/2001 | Lang et al. |
| 6,314,420 B1 | 11/2001 | Lang et al. |
| 6,321,228 B1 * | 11/2001 | Crandall et al. ............... 707/10 |
| 6,327,593 B1 | 12/2001 | Goiffon |
| 6,366,908 B1 | 4/2002 | Chong et al. |
| 6,377,259 B1 | 4/2002 | Tenev et al. |
| 6,385,602 B1 | 5/2002 | Tso et al. |
| 6,424,973 B1 | 7/2002 | Baclawski |
| 6,442,545 B1 | 8/2002 | Feldman et al. |
| 6,453,312 B1 | 9/2002 | Goiffon et al. |
| 6,453,339 B1 | 9/2002 | Schultz et al. |
| 6,477,524 B1 | 11/2002 | Taskiran et al. |
| 6,492,989 B1 | 12/2002 | Wilkinson |
| 6,496,818 B1 | 12/2002 | Ponte |
| 6,510,406 B1 | 1/2003 | Marchisio |
| 6,513,036 B2 | 1/2003 | Fruensgaard et al. |
| 6,523,028 B1 | 2/2003 | DiDomizio et al. |
| 6,532,469 B1 | 3/2003 | Feldman et al. |
| 6,539,376 B1 | 3/2003 | Sundaresan et al. |
| 6,564,210 B1 | 5/2003 | Korda et al. |
| 6,567,797 B1 | 5/2003 | Schuetze et al. |
| 6,567,804 B1 | 5/2003 | Ramasamy et al. |
| 6,611,825 B1 | 8/2003 | Billheimer et al. |
| 6,628,312 B1 | 9/2003 | Rao et al. |
| 6,629,095 B1 | 9/2003 | Wagstaff et al. |
| 6,629,097 B1 | 9/2003 | Keith |
| 6,633,868 B1 | 10/2003 | Min et al. |
| 6,636,848 B1 * | 10/2003 | Aridor et al. ................... 707/3 |
| 6,654,761 B2 | 11/2003 | Tenev et al. |
| 6,675,159 B1 | 1/2004 | Lin et al. |
| 6,678,700 B1 | 1/2004 | Moore et al. |
| 6,684,207 B1 | 1/2004 | Greenfield et al. |
| 6,701,305 B1 | 3/2004 | Holt et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,766,316 B2 | 7/2004 | Caudill et al. |
| 6,778,979 B2 | 8/2004 | Grefenstette et al. |
| 6,862,713 B1 | 3/2005 | Kraft et al. |
| 6,892,189 B2 | 5/2005 | Quass et al. |
| 6,895,406 B2 | 5/2005 | Fables et al. |
| 6,901,555 B2 | 5/2005 | Hida et al. |
| 6,928,398 B1 | 8/2005 | Fang et al. |
| 6,941,321 B2 | 9/2005 | Schuetze et al. |
| 6,944,626 B2 | 9/2005 | Cameron et al. |
| 6,961,731 B2 | 11/2005 | Holbrook |
| 6,970,881 B1 | 11/2005 | Mohan et al. |
| 6,976,016 B2 | 12/2005 | Chang et al. |
| 6,976,017 B1 | 12/2005 | Getchius |
| 7,023,453 B2 | 4/2006 | Wilkinson |
| 7,194,460 B2 * | 3/2007 | Komamura .................... 707/4 |
| 7,194,483 B1 | 3/2007 | Mohan et al. |
| 7,349,895 B2 | 3/2008 | Liu et al. |
| 2002/0007373 A1 | 1/2002 | Blair et al. |
| 2002/0069203 A1 | 6/2002 | Dar et al. |
| 2002/0091696 A1 | 7/2002 | Craft et al. |
| 2002/0107844 A1 | 8/2002 | Cha et al. |
| 2002/0120609 A1 | 8/2002 | Lang et al. |
| 2002/0129015 A1 | 9/2002 | Caudill et al. |
| 2003/0014403 A1 | 1/2003 | Chandrasekar et al. |
| 2003/0018659 A1 | 1/2003 | Fuks et al. |
| 2003/0069882 A1 | 4/2003 | Nieswand et al. |
| 2003/0149586 A1 | 8/2003 | Chen et al. |
| 2003/0163454 A1 | 8/2003 | Jacobsen et al. |
| 2003/0187632 A1 | 10/2003 | Menich |
| 2004/0002959 A1 | 1/2004 | Alpert et al. |
| 2004/0019588 A1 | 1/2004 | Doganata et al. |
| 2004/0049478 A1 | 3/2004 | Jasper et al. |
| 2004/0083206 A1 | 4/2004 | Wu et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0199498 A1 | 10/2004 | Kapur et al. |
| 2004/0215634 A1 | 10/2004 | Wakefield et al. |
| 2004/0254916 A1 | 12/2004 | Dettinger et al. |
| 2005/0021290 A1 | 1/2005 | Velipasaoglu et al. |
| 2005/0021357 A1 | 1/2005 | Schuetze et al. |
| 2005/0021512 A1 | 1/2005 | Koenig |
| 2005/0060340 A1 | 3/2005 | Sommerfield et al. |
| 2005/0065967 A1 | 3/2005 | Schuetze et al. |
| 2005/0091197 A1 | 4/2005 | Dettinger et al. |
| 2005/0091198 A1 | 4/2005 | Dettinger et al. |
| 2005/0108256 A1 | 5/2005 | Wakefield et al. |
| 2005/0149496 A1 | 7/2005 | Mukherjee et al. |
| 2005/0154692 A1 | 7/2005 | Jacobsen et al. |
| 2005/0154711 A1 | 7/2005 | McConnell |
| 2005/0160080 A1 | 7/2005 | Dawson |
| 2005/0160082 A1 | 7/2005 | Dawson |
| 2005/0160107 A1 * | 7/2005 | Liang ........................ 707/100 |
| 2005/0166152 A1 | 7/2005 | Hida et al. |
| 2005/0192824 A1 | 9/2005 | Schuetze et al. |
| 2005/0193055 A1 | 9/2005 | Angel et al. |
| 2005/0234879 A1 | 10/2005 | Zeng et al. |
| 2005/0246320 A1 | 11/2005 | Benysh et al. |
| 2005/0278323 A1 | 12/2005 | Horvitz et al. |
| 2006/0015486 A1 * | 1/2006 | Nomiyama et al. ............ 707/3 |
| 2006/0047649 A1 * | 3/2006 | Liang ........................... 707/4 |

| | | |
|---|---|---|
| 2006/0106793 A1* | 5/2006 | Liang .......................... 707/5 |
| 2008/0065603 A1 | 3/2008 | Carlson |

FOREIGN PATENT DOCUMENTS

| | | |
|---|---|---|
| WO | WO 99/18825 | 9/1999 |
| WO | WO 00/063841 | 10/2000 |
| WO | WO 01/22280 A2 | 3/2001 |
| WO | WO 02/39254 A1 | 5/2002 |
| WO | WO 03/040892 A2 | 5/2003 |
| WO | WO 2004/053645 A2 | 6/2004 |
| WO | WO 2005/069881 A1 | 8/2005 |

OTHER PUBLICATIONS

European Search Report issued in EP Application No. 06816600.8, Jun. 15, 2009, 6 pgs.
Jang, Ho Wook and Se Young Park, "Keyfact Concept for an Information Retrieval System," Proceedings of Natural Language Processing Pacific Rim Symposium, pp. 510-513, Dec. 4-7, 1995.
Jun, M.S. & Park, S. Y. "Keyfact-Based Information Retrival System", International Symposium on Digital Library, pp. 521-554 (1997).
Codd, E.F. et al., "Providing OLAP to User-Analysts: An IT Mandate," Hyperion Solutions Corporation, CA, 1993 pp. 1-20.
Grotevant, S.M. and Foth D. "The Power of Multidimensional Analysis (OLAP) in Higher Education Enterprise Reporting Strategies," presented at CUMREC 1999, printed Feb. 27, 2006 from http://www.educause.edu/ir/library/html/cmr9917/cmr9917.html, 8 pages.
U.S. Appl. No. 10/695,426, filed Oct. 3, 2003 (related application).
U.S. Appl. No. 10/677,492, filed Oct. 3, 2003 (related application).
U.S. Appl. No. 11/275,046, filed Dec. 5, 2005 (related application).
U.S. Appl. No. 11/275,048, filed Dec. 5, 2005 (related application).
U.S. Appl. No. 12/423,024, filed Apr. 14, 2009 (related application).
Office Action, U.S. Appl. No. 10/087,053, filed Mar. 1, 2002, Office Action dated Aug. 20, 2004—Patented U.S. Patent No. 6,970,881, issued Nov. 29, 2005.
Office Action, U.S. Appl. No. 10/393,677, filed Mar. 19, 2003, Office Action dated Dec. 7, 2005—Patented U.S. Patent No. 7,194,483, issued Mar. 20, 2007.
Office Action, U.S. Appl. No. 10/677,492, filed Oct. 3, 2003, Office Action dated May 2, 2006.
Office Action, U.S. Appl. No. 10/677,492, filed Oct. 3, 2003, Office Action dated Feb. 27, 2007.
Office Action, U.S. Appl. No. 10/677,492, filed Oct. 3, 2003, Office Action dated Aug. 27, 2007.
Office Action, U.S. Appl. No. 10/677,492, filed Oct. 3, 2003, Office Action dated Apr. 21, 2008.
Office Action, U.S. Appl. No. 10/677,492, filed Oct. 3, 2003, Office Action dated Dec. 23, 2008.
Office Action, U.S. Appl. No. 10/695,426, filed Oct. 3, 2003, Office Action dated Aug. 23, 2007.
Office Action, U.S. Appl. No. 10/695,426, filed Oct. 3, 2003, Office Action dated Jun. 17, 2008.
Office Action, U.S. Appl. No. 10/695,426, filed Oct. 3, 2003, Office Action dated Mar. 5, 2009.
Office Action, U.S. Appl. No. 10/695,426, filed Oct. 3, 2003, final Office Action dated Nov. 9, 2009.
Office Action, U.S. Appl. No. 11/275,046, filed Dec. 5, 2005, Office Action dated Oct. 31, 2007.
Office Action, U.S. Appl. No. 11/275,046, filed Dec. 5, 2005, Office Action dated Jul. 25, 2008.
Office Action, U.S. Appl. No. 11/275,046, filed Dec. 5, 2005, Office Action dated Mar. 18, 2009.
Office Action, U.S. Appl. No. 11/275,046, filed Dec. 5, 2005, Office Action dated Oct. 13, 2009.
Office Action, U.S. Appl. No. 11/275,048, filed Dec. 5, 2005, Office Action dated Dec. 11, 2007.
Office Action, U.S. Appl. No. 11/275,048, filed Dec. 5, 2005, Office Action dated Aug. 29, 2008.
Office Action, U.S. Appl. No. 11/275,048, filed Dec. 5, 2005, Office Action dated Jun. 11, 2009.
Office Action, U.S. Appl. No. 11/275,050, filed Dec. 5, 2005, Office Action dated Nov. 14, 2007—Patented—U.S. Patent No. 7,536,413, issued May 19, 2009.
Office Action U.S. Appl. No. 11/275,050, filed Dec. 5, 2005, Office Action dated Jul. 29, 2008—Patented—U.S. Patent No. 7,536,413, issued May 19, 2009.
Office Action U.S. Appl. No. 11/656,017, filed Jan. 22, 2007, Office Action dated Jan. 26, 2009.
Notice of Allowance, U.S. Appl. No. 11/656,017, filed Jan. 22, 2007, Notice of Allowance dated Oct. 5, 2009.
Notice of Allowance, U.S. Appl. No. 10/087,053, filed Mar. 1, 2002, Notice of Allowance dated Mar. 28, 2005.
Notice of Allowance, U.S. Appl. No. 10/393,677, filed Mar. 19, 2003, Notice of Allowance dated Dec. 29, 2006.
Notice of Allowance, U.S. Appl. No. 10/677,492, filed Oct. 3, 2003, Notice of Allowance dated Jul. 10, 2009—Patented—U.S. Patent No. 7,627,588, issued Dec. 1, 2009.
Notice of Allowance, U.S. Appl. No. 11/275,050, filed Dec. 5, 2005, Notice of Allowance dated Dec. 2, 2008—Patented—U.S. Patent No. 7,536,413, issued May 19, 2009.
U.S. Appl. No. 10/695,426, filed Oct. 29, 2003, Mohan et al.
U.S. Appl. No. 10/677,492, filed Oct. 3, 2003, Mohan et al.
Giger, H. P., "Concept Based Retrieval in Classical IR Systems," Proceedings of the Eleventh Annual International ACM SIGIR Conference on Research and Development in Information Retrieval, May 1998, pp. 275-289.
Haveliwala, T. H., "Topic-Sensitive PageRank: A Context-Sensitive Ranking Algorithm for Web Search," Eleventh International Conference on World Wide Web, May 7-11, 2002.
Jain, A. K. et al., "Data Clusterin: A Review," ACM Computing Surveys, Sep. 1999, pp. 264-323, vol. 31, No. 3.
Kolda, T. G. et al., "Semidiscrete Matrix Decomposition for Latent Semantic Indexing in Information Retrieval," ACM Transactions on Information Systems, Oct. 1998, pp. 322-346, vol. 16, No. 4.
Kritzestein, B., "Starlight: Knowledge Management on a Whole New Plane," Chemical and Biological Defense Information Analysis Center (CBIAC) Newsletter, 2004, pp. 10-12, vol. 5, No. 4.
Lawrence, S., "Context in Web Search," IEEE Data Engineering Bulletin, 2000, pp. 25-32, vol. 23, No. 3.
Leake, D. et al., "Exploiting Rich Context: An Incremental Approach to Context-Based Web Search," Proceedings of Fifth International and Interdisciplinary Conference on Modeling and Using Context, Paris, France, Jul. 5-8, 2005, pp. 254-267, vol. 3554.
Leake, D. B. et al., "Towards Context-Based Search Engine Selection," Sixth International Conference on Intelligent User Interfaces, Jan. 14-17, 2001, pp. 109-112, Santa Fe, New Mexico.
Nigam, K. et al., "Learning to Classify Text From Labeled and Unlabeled Documents," Proceedings of AAAI-98, 15th Conference of the American Association for Artificial Intelligence, 1998.
Salton, G. et al., "A Vector Space Model for Automatic Indexing," Communications of the ACM, Nov. 1975, pp. 613-620, vol. 18, No. 11.
Singh, L. et al., "Generating Association Rules From Semi-Structured Documents Using an Extended Concept Hierarchy," Proceedings of the Sixth International Conference on Information and Knowledge Management, Nov. 10-14, 1997, pp. 193-200.
Yang, Y., "An Evaluation of Statistical Approaches to Text Categorization," Information Retrieval I, 1991, pp. 69-90.
Ankerst, M. et al., "DataJewel: Tightly Integrating Visualization with Temporal Data Minign," ICDM Workshop on Visual Data Mining, Melbourne, FL. Nov. 19-23, 2003.
Arents, H. C. et al., "Concept-Based Retrieval of Hypermedia Information: From Term Indexing to Semantic Hyperindexing," Information Processing & Management, 1993, pp. 373-386, vol. 29, No. 3.
Belew, R., "A Connectionist Approach to Conceptual Information Retrieval," ICAIL, May 27-29, 1987.
Bhatia, S. et al., "Conceptual Clustering in Information Retrieval," IEEE Transactions on Systems, Man, and Cybernetics - Part B: Cybernetics, Jun. 1998, pp. 427-435, vol. 28, No. 3.
Boeing Frontiers, "Text Mining, for Golden Results," Jul. 2005, p. 50.
Botev, C. et al. "Context-Sensitive Keyword Search and Ranking for XML," Eighth International Workshop on the Web and Databases, Jun. 16-17, 2005.

Crough, C. J. et al., "Experiments in Automatic Statistical Thesaurus Construction," Proceedings of the Fifteenth Annual International ACM SIGIR Conference on Development in Information Retrieval, Jun. 21-24, 1992, pp. 77-88.

Deerwester, S. et al., "Indexing by Latent Semantic Analysis," Journal of the Society for Information Science, Sep. 1990, pp. 391-407, vol. 41, No. 6.

Dumais, S. et al., "Inductive Learning Algorithms and Representatons For Text Categorization," Proceedings of the Seventh International Conference on Information and Knowledge Management, 1998, pp. 148-155, ACM Press.

Dumais, S. et al "Optimizing Search by Showing results in Context," SIGCHI '01, Mar. 31-Apr. 5, 2001.

Fagan, J. L., "Automatic Phrase Indexing for Document Retrieval: An Examination of Syntactic and Non-Syntactic Methods," Proceedings of the Tenth Annual International ACM SIGIR Conference on Research and Development in Information Retrieval, Jun. 3-5, 1987, pp. 91-101.

Feldman R., "Tutorial 4. Mining Unstructured Data," KDD Tutorial Notes, 1999, pp. 182-236.

Finkelstein, L. et al., "Placing Search in Context: The Concept Revisited," Tenth International Conference on World Wide Web, May 1-5, 2001, pp. 406-414.

\* cited by examiner

ND COMPUTER
SYSTEM, METHOD AND COMPUTER PROGRAM PRODUCT FOR CONCEPT-BASED SEARCHING AND ANALYSIS

PRIORITY

The present application claims priority to U.S. provisional application No. 60/724,914, entitled "System, Method, and Computer Program Product for Concept Based Searching and Analysis," filed on Oct. 11, 2005, which is hereby incorporated by reference herein.

FIELD OF THE INVENTION

The invention generally relates to a system, method, and computer program product for conducting concept-based searches. The invention relates to a system, method, and computer program product for analyzing, discovering, classifying, retrieving, and creating information. In particular, but not by way of limitation, the present invention relates to a system, method, and computer program product for searching, analyzing, and creating information based on concepts.

BACKGROUND OF THE INVENTION

As the use of the Internet becomes more pervasive, business entities and individuals ("entities") are increasingly using the Internet as a tool for obtaining information. For example, an entity might check numerous World Wide Web sites and/or databases ("sites") for documents of interest to that entity. Typically, the entity will use a search engine to check these sites. In recent years, sophistication of search engines has improved, increasing the search engines' ability to produce search results that closely reflect the interests of the entity. The entity, now presented with a larger volume of relevant documents, cannot ignore the first, second, third or nth document returned by a search engine, and must instead consider nearly all of the documents in order to comprehensively understand the context related to the entity's interests.

Recent industry research by OutSell, Inc., demonstrates that entities are spending far more time than ever gathering data. At least a portion of this time could be more-effectively spent on analysis of the gathered data, which would ultimately lead to the discovery of critical information important to the entity.

Additionally, investment by the entity in more sophisticated search technology may actually lead to even less time for analysis. According to the Delphi Group, businesses are using anywhere from four to eight different search engines. Whether amassed from the public Internet, the corporate intranet, or information sources such as Lexis Nexis, the result is information overload.

Results of current search solutions are putting more pressure on an entity, causing the entity struggle with making sense of a gluttonous amount of relevant information. Ultimately, it is the entity that must relate relevant information from a large volume of documents in a timely, insightful and comprehensive manner. Additionally, the information available for a given interest of an entity changes over time. Consequently, an entity may be tasked with tracking, over a period of time, any additions and/or deviations pertaining to the interests of that entity. In such instances, the expanded volume of the search results places more burden on the entity.

As available information increases by the second, the next generation of search solutions will need to implement companion technologies that work with existing search engines to provide new search and analysis capabilities to an entity. These new solutions must provide entities with a sophisticated and efficient method for defining what is important to them. In other words, the new search solutions must allow the entity to perform searches using the entity's "personal lens" as opposed to standard enterprise taxonomies and search results that attempt to support the needs of all entities as if the interests of the entities were homogeneous. In addition, the next generation of search solutions must provide entities with expanded control over critical analytics by allowing the entity to create customized charts, graphs, text and/or various other methods for displaying search results. In addition, the next generation of search solutions must support collaborative efforts between entities.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Several aspects of the invention pertain to a system, method, and computer product for performing a concept-based search. According to these aspects, one or more concepts are identified and a search query is formed based on the identified concepts. The search query is used to perform one or more searches that retrieve one or more search results.

Additional aspects of the invention pertain to a system, method, and computer product for creating content. According to these aspects, one or more concepts are identified in a first content source. Context related to at least one of the one or more concepts is extracted from the first content source, and a second content source is populated with at least a portion of the context.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein.

DETAILED DESCRIPTION

The invention generally relates to a system, method, and computer program product for conducting concept-based searches. Several of the embodiments of the invention permit users to search unstructured information using searching parameters derived from concepts. Other embodiments of the invention permit users to extract concepts from search results identified during concept-based searches. Additional embodiments of the invention permit users to create data, text, images, and/or other suitable content using search results, concepts extracted from search results, previously defined concepts, and/or a collection of files, documents, emails, websites, and/or blogs.

Figure 1:
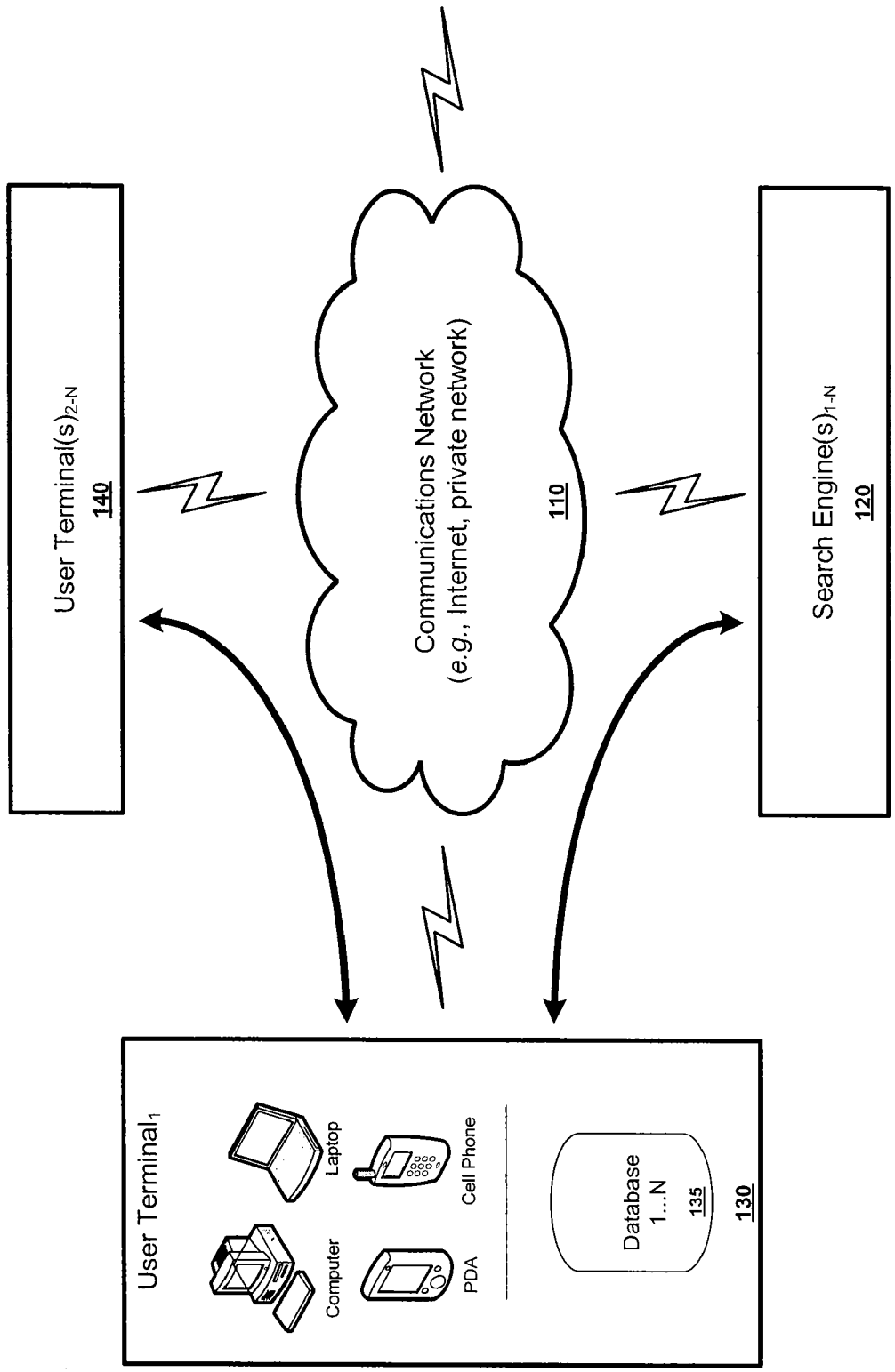
FIG. 1 shows a block diagram depicting a typical network system for conducting concept-base searches in accordance with one embodiment of the invention.

Aspects of the invention are designed to operate on computer systems, servers, and/or other like devices. While the details of the invention may vary and still be within the scope of the claimed invention, FIG. 1 shows a block diagram depicting a typical network system 100 for conducting concept-base searches. The network system 100 is only one example of a suitable computing environment and is not intended to suggest any limitation as to the scope of use or functionality of the invention. Neither should the network system 100 be interpreted as having any dependency or requirement relating to any one or combination of components illustrated in the exemplary network system 100.

Aspects of the invention may be described in the general context of computer-executable instructions, such as program modules, being executed by a computer or server. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

As is shown, the network system 100 includes a communications network 110, such as the Internet or a private network, capable of providing communication between search engine(s) 120, user terminal 130, and other user terminal(s) 140 described hereinafter. The devices of FIG. 1 may communicate with each other via any number of methods known in the art, including wired and wireless communication pathways.

As those skilled in the art will appreciate, various intermediary network routing and other elements between the communication network 110, the search engines 120, the user terminal 130, and the user terminals 140 have been omitted for the sake of simplicity. Such intermediary elements may include, for example, the public-switched telephone network (PSTN), gateways or other server devices, and other network infrastructure provided by Internet service providers (ISPs).

As shown in FIG. 1, the user terminal 130 may comprise one or more computing devices, including a computer, a laptop, a personal digital assistant (PDA), a cell phone, and/or any other computing device capable of operating within both the scope and spirit of the invention. The user terminal 130 may also include one or more databases 135 for storage of data accessible to the one or more computing devices, as well as other computing devices (not shown) in the network system 100.

Concept-Based Searching

One or more embodiments of the invention pertain to the creation, use, and modification of one or more concepts. In a preferred embodiment, a concept represents one or more meanings, in view of one or more particular frames of reference and/or contexts. The concept may comprise one or more elements such as words, images, numbers, symbols, ideas, and/or relationships shared between words, images, numbers, symbols, documents, data sets, and/or other relationships. One of skill in the art will appreciate additional elements of concepts while keeping within both the scope and spirit of the invention. Concepts are described in additional detail in patent application Ser. No. 10/695,426, entitled "Concept-Based Method and System for Dynamically Analyzing Results from Search Engines," filed on Oct. 29, 2003, which is incorporated herein by reference and which is a continuation in part of patent application Ser. No. 10/677,492, entitled "System and Method for Concept Based Analysis of Unstructured Data," filed on Oct. 3, 2003, which is incorporated herein by reference and which is a continuation in part of patent application Ser. No. 10/393,677, entitled "Concept-Based Method and System for Dynamically Analyzing Unstructured Information and Providing Trends and Exceptions Tracking Capabilities," filed on Mar. 19, 2003, which is incorporated herein by reference and which is a continuation in part of U.S. Pat. No. 6,970,881, entitled "Concept-Based Method and System for Dynamically Analyzing Unstructured Information." filed on Mar. 1, 2002, which is incorporated herein by reference and which claims priority to provisional application No. 60/302,971, filed on May 5, 2001, which is incorporated herein by reference.

Figure 2:
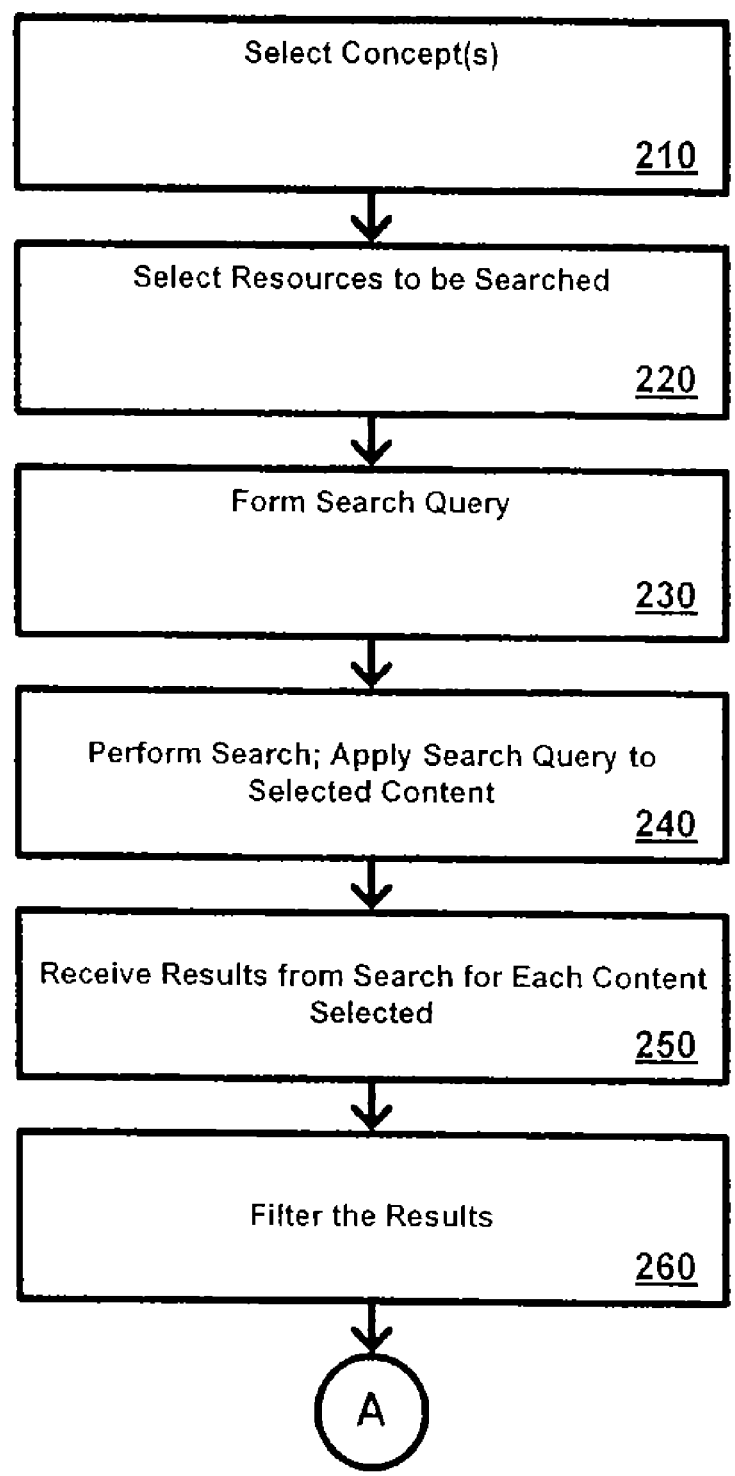
FIG. 2 illustrates a flowchart detailing a concept-based search process in accordance with one embodiment of the invention.

Attention is now drawn to FIG. 2, which illustrates a flowchart detailing a concept-based search process performed by the system 100 for identifying, analyzing, and refining relevant search results.

Figure 3:
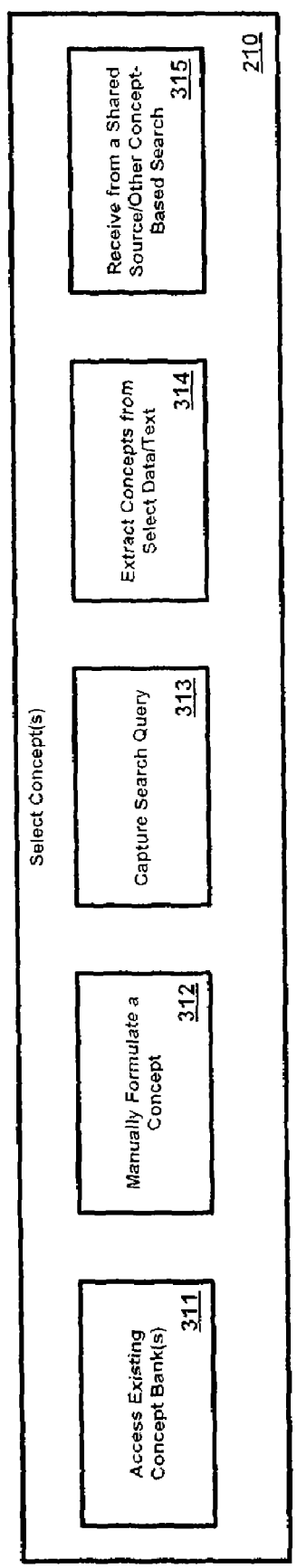
FIG. 3 depicts five methods for selecting the one or more concepts in accordance with one embodiment of the invention.

As illustrated in step 210, the user terminal 130 selects one or more concepts to form the basis of a concept-based search. By way of example, FIG. 3 depicts five methods for selecting the one or more concepts.

For example, the user terminal 130 may access one or more existing concept bank(s) that each store one or more predefined concepts (step 311). Concept banks, as described in accordance with some embodiments of the invention, may be stored at any number of locations in the system 100, including the database 135. Storage of the concept banks may be implemented using any number of file extensions, including *.CBK or *.IXR. One of skill in the art will appreciate alternative storage locations and file extensions while keeping within both the scope and the spirit of the invention.

Another method for selecting the one or more concepts allows the user terminal 130 to formulate a concept via user input that describes the concept (step 312). The description entered by the user may include words, phrases, sentences, paragraphs, and/or other information (e.g., images, numbers, symbols, data, etc.), that signify the meaning of the concept. The description may alternatively consist of one or more pieces of information taken from data, text, and/or imagex. New concepts, like those created with respect to step 312, may be added to a temporary, new, or existing concept bank stored in the database 135 or in any other suitable storage device.

The user terminal 130 may alternatively capture one or more search queries stored in the database 135 and/or in other storing mechanisms connected to the user terminal 130 (step 313). In this way, the user terminal 130 may capture search queries entered by one or more users through various search interfaces. The search queries represent the access habits of the one or more users, and may therefore be useful to define concepts of interest for those one or more users.

An optional method for selecting the one or more concepts allows the user terminal 130 to extract a new concept from data and/or text (step 314). In several embodiments of the invention, a user at the user terminal 130 selects specific data and/or text, and the user terminal 130 extracts concepts from the selected data/text. One example of a concept extraction procedure may be found in patent application Ser. No. 10/695,426, entitled "Concept-Based Method and System for Dynamically Analyzing Results from Search Engines," filed on Oct. 29, 2003, which is incorporated herein by reference and which is a continuation in part of patent application Ser. No. 10/677,492, entitled "System and Method for Concept Based Analysis of Unstructured Data," filed on Oct. 3, 2003, which is incorporated herein by reference and which is a continuation in part of patent application Ser. No. 10/393,677, entitled "Concept-Based Method and System for Dynamically Analyzing Unstructured Information and Providing Trends and Exceptions Tracking Capabilities," filed on Mar. 19, 2003, which is incorporated herein by reference and which is a continuation in part of U.S. Pat. No. 6,970,881, entitled "Concept-Based Method and System for Dynamically Analyzing Unstructured Information." filed on Mar. 1, 2002, which is incorporated herein by reference and which claims priority to provisional application No. 60/302,971, filed on May 5, 2001, which is incorporated herein by reference; however, one of skill in the art will appreciate that alternative extraction algorithms may be used to extract concepts automatically from the selected data and/or text.

Another option for selecting the one or more concepts includes receiving a concept from a shared source (e.g., another user, a website, etc.) or another concept-based search (step 315). This scenario is similar to the scenario described with respect to step 311 because the concepts are predefined and accessibly stored.

One of skill in the art will recognize alternative embodiments not described above that allow the user terminal 130 to select one or more concepts.

Attention is now drawn to step 220 of FIG. 2, where the user terminal 130 selects content that is to be search. Sources of the content may include the World Wide Web ("WWW"), specified databases (e.g., the database 135), specified documents, and/or specified collections of data. During this step, the user terminal 130 may identify one or more internal and/or external search engines to be used while accessing the selected content.

Internal search engines search the contents of the user terminal 130 (e.g., the database 130) and/or other file systems visible to the user terminal 130 via networks similar to the communication network 110. Examples of internal search engines include Microsoft's desktop search application, Google Desktop, and Enfish.

External search engines search any network external to the user terminal 130. Examples of external search engines include public search engines like Google, MSN, and Yahoo!, that search the Internet. External search engines may also include private search engines that search Intranet documents.

Figure 4:
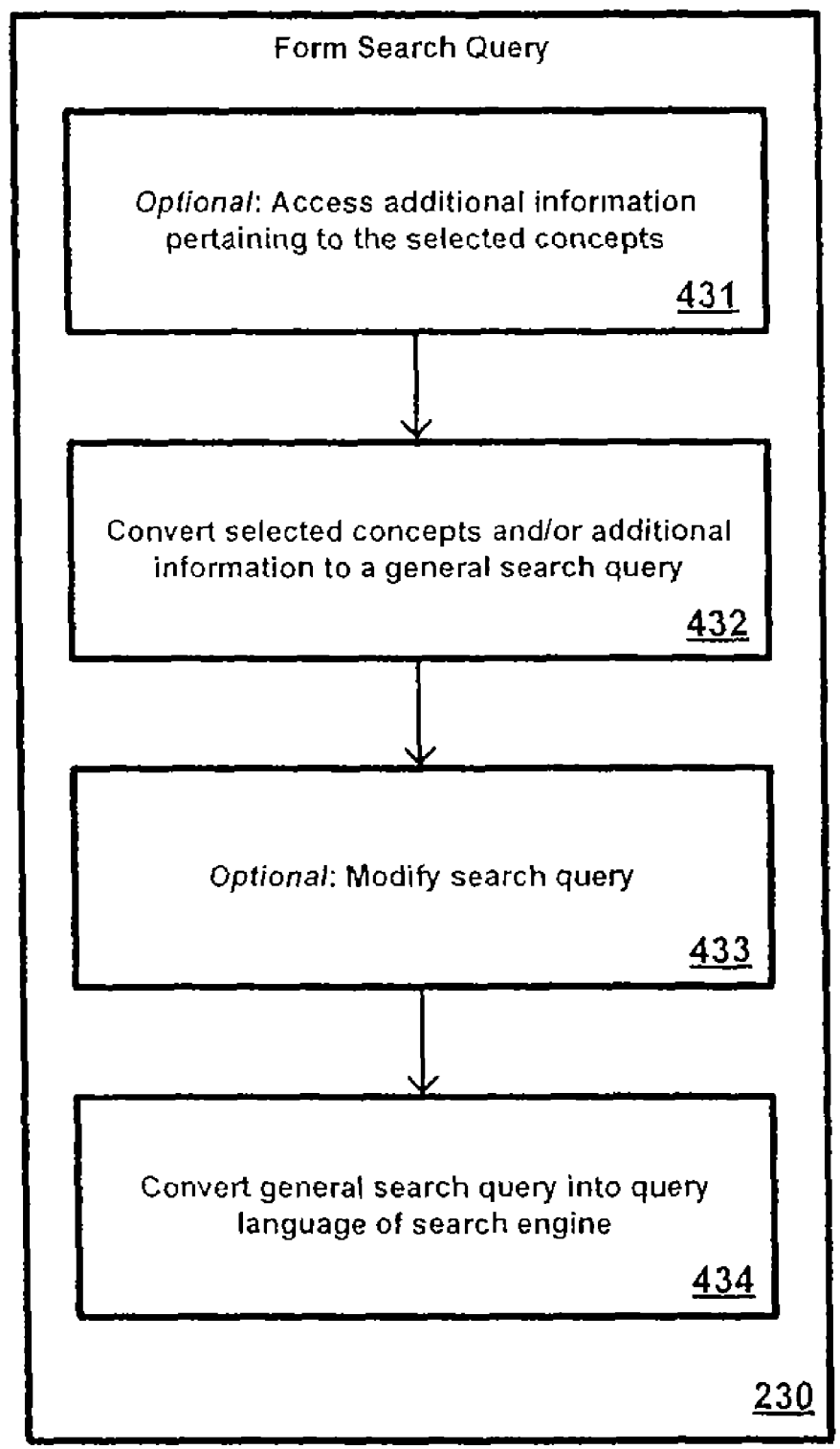
FIG. 4 illustrates a plurality of steps used to formulate a search query in accordance with one embodiment of the invention.

The user terminal 130, in step 230, formulates a search query based on the selected concepts and/or the selected content. By way of example, FIG. 4 illustrates a plurality of steps used to formulate a search query in accordance with one embodiment of the invention. In step 431, the user terminal 130 accesses additional information pertaining to the selected concepts. The additional information may include, among other things, definitions and/or associated descriptions pertaining to concepts selected in step 210 of FIG. 2. The additional information may also or alternatively include information taken from the original sources of the concepts.

The user terminal 130, in step 432, creates a general search query using the additional information accessed in step 431. The general search query may comprise text in addition to various search operators that enable the user terminal 130 to refine and/or expand the scope of the concept-based search. Examples of search operators include Boolean operators, proximity operators, occurrence operators, synonym operators, and various other operators known in the art. In step 433, the user terminal 130 then modifies the general search query via user input or an algorithm that analyzes that contents of the general search query with respect to necessity and/or effectiveness.

The user terminal 130, at step 434, converts the general search query to the query language of each search engine identified in step 220 of FIG. 2. In one embodiment, if a particular search engine does not support a certain search operator used in the general search query, the user terminal 130 will replace that certain search operator with a more-relaxed operator supported by the search engine. For example, if the general search query included a proximity operator that the search engine does not support, the user terminal 130 may instead use a Boolean operator (e.g., 'AND') for that search engine.

According to FIG. 2, once a search query is formed for a particular search engine, the user terminal 130 may perform a search on the content selected in step 220 that is accessible by the particular search engine (step 240). Prior to the search, the user terminal 130 may restrict the search to certain dates, document types, databases, and other parameters. Following the search, the user terminal 130 may receive one or more search results pertaining to that particular search engine and other search engines on which a similar search was conducted (step 250).

Figure 5:
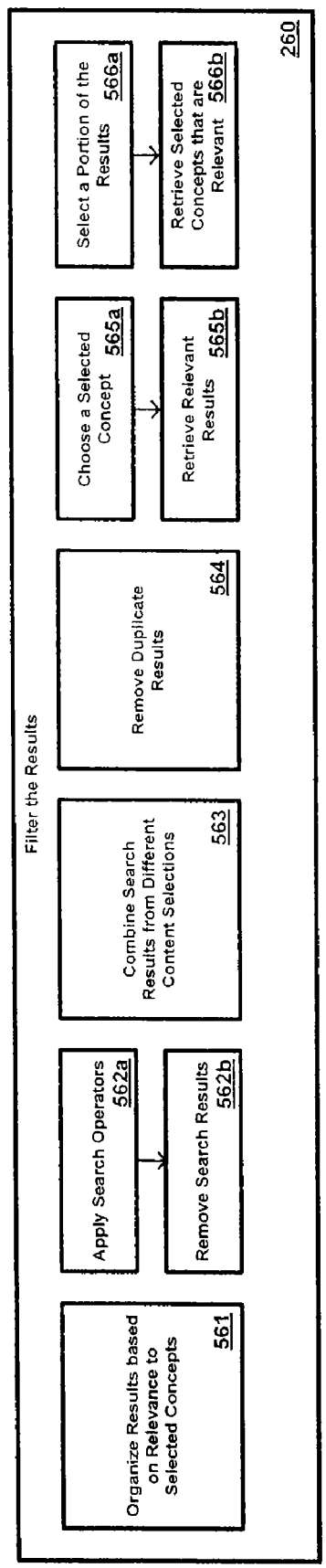
FIG. 5 depicts several steps that are potentially performed during a filtering step in accordance with one embodiment of the invention.

Following the receipt of the one or more search results, the user terminal 130 filters the search results (step 260). By way of example, FIG. 5 depicts several actions that are potentially taken by the user terminal 130 during filtering step 260. For example, in one embodiment the user terminal 130 may organize at least a portion of the search results based on the relevance of that portion of search results to one or more of the selected concepts (step 561). One example of determining the relevance of search results to one or more selected concepts may be found in patent application Ser. No. 10/695,426, entitled "Concept-Based Method and System for Dynamically Analyzing Results from Search Engines," filed on Oct. 29, 2003, which is incorporated herein by reference; however, one of skill in the art will appreciate that alternative methods, systems, and computer programs may be used to determine the relevance of search results to selected concepts.

In other embodiments, the user terminal 130 may apply, to a particular search result, any of the search operators that were not applied by a particular search engine (step 562a). In this embodiment, the user terminal 130 may take the additional step of removing portions of the search results that do not match the search operators (step 562b). Additionally, the user terminal 130 may organize the updated search results based on a relevancy determination similar to that described with respect to step 561.

In another embodiment, the user terminal 130 may combine search results from different search engines (step 563), and/or remove duplicative portions of the combined search results (step 564). Additionally, the user terminal 130 may remove duplicative portions within a single search result. The user terminal 130 may then organize the combined search results based on relevance to the selected concepts (step 561).

Still, in other embodiments, the user terminal 130 may, for a selected concept chosen via user input or an algorithm (step 565a), retrieve one or more portions of the search results that pertain to that selected concept (565b). The user terminal 130 may additionally organize the retrieved portions of the search results based on a relevancy to the selected concept (step 561).

In yet other embodiments, the user terminal 130 may select one or more portions of the search results (step 566a), and then retrieve selected concepts that pertain to the selected portions of the search results (step 566b). The user terminal 130 may additionally organize the retrieved concepts based on a relevancy to the portions of the search results.

Figure 6:
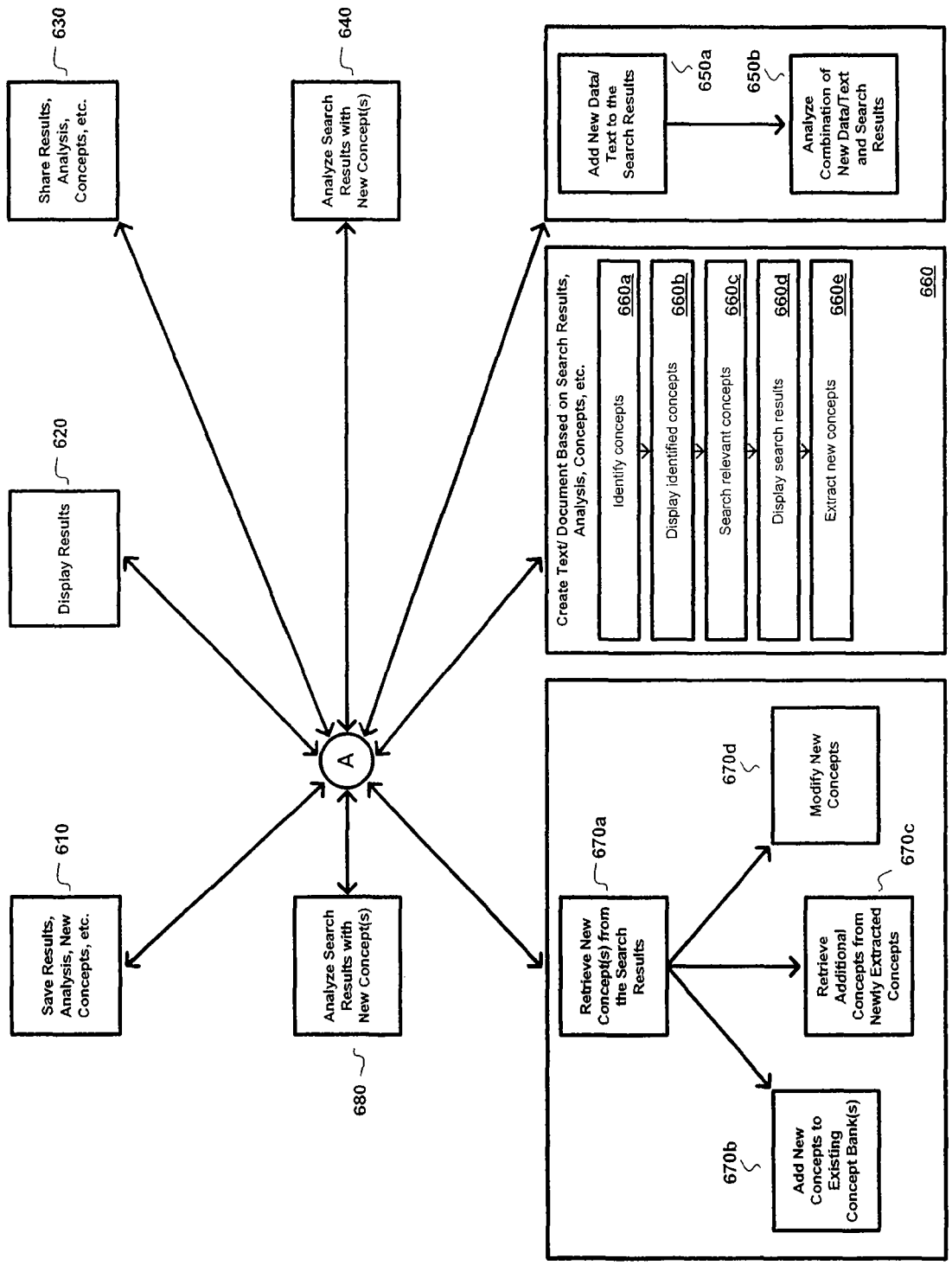
FIG. 6 depicts a plurality of steps that are potentially performed after search results are filtered in accordance with one embodiment of the invention.

Attention is now drawn to FIG. 6, which depicts a diagram of a plurality of actions available to the user terminal 130 after the search results are filtered in step 260 of FIG. 2.

According to FIG. 6, the user terminal 130 may save any of the search results, any subsequent analysis pertaining to the search results, any of the concepts selected in step 210 or FIG. 2, and/or any new concepts derived from the search results (step 610).

In one embodiment, the user terminal 130 may save any search results, analysis, and associated concepts in an analytic workbook. The analytical workbook can be accessed at any time for continued analysis and/or additional searching. Additionally, the contents of multiple analytical workbooks may be combined for subsequent analysis and/or searching.

In another embodiment, the user terminal 130 may save search results from one or more searches in one or more virtual folders with specified descriptions. A specific virtual folder description may be a concept or any other description capable of conveying the content stored in a specific virtual folder. Additionally, the user terminal 130 may select one or more concepts and apply them to the contents of any number of virtual folders. In this manner, the user terminal 130 is able to leverage portions of different searches that are relevant to the current search being performed by the user terminal 130.

In yet another embodiment, the user terminal 130 may request that search results be automatically routed to certain virtual folders based on any number of factors, including relevance of the search results to the virtual folder description.

As shown in FIG. 6, the user terminal 130 may display representations of all or a portion of the search results, analysis, and/or concepts (step 620). For example, in one embodiment the user terminal 130 may display a search results-concepts matrix, which places concepts on a first axis, search results on a second axis, and a metric, which is associated with a relationship between each of the selected concepts and each portion of the search results, at the intersection(s) of the first axis and the second axis. The metric associated with a relationship between each of the selected concepts and each portion of the search results may include any number of relationships. For example, but not by way of limitation, such relationships may include relevancy, non-relevancy, degree of presence, degree of absence, and/or proximity.

Figure 7:
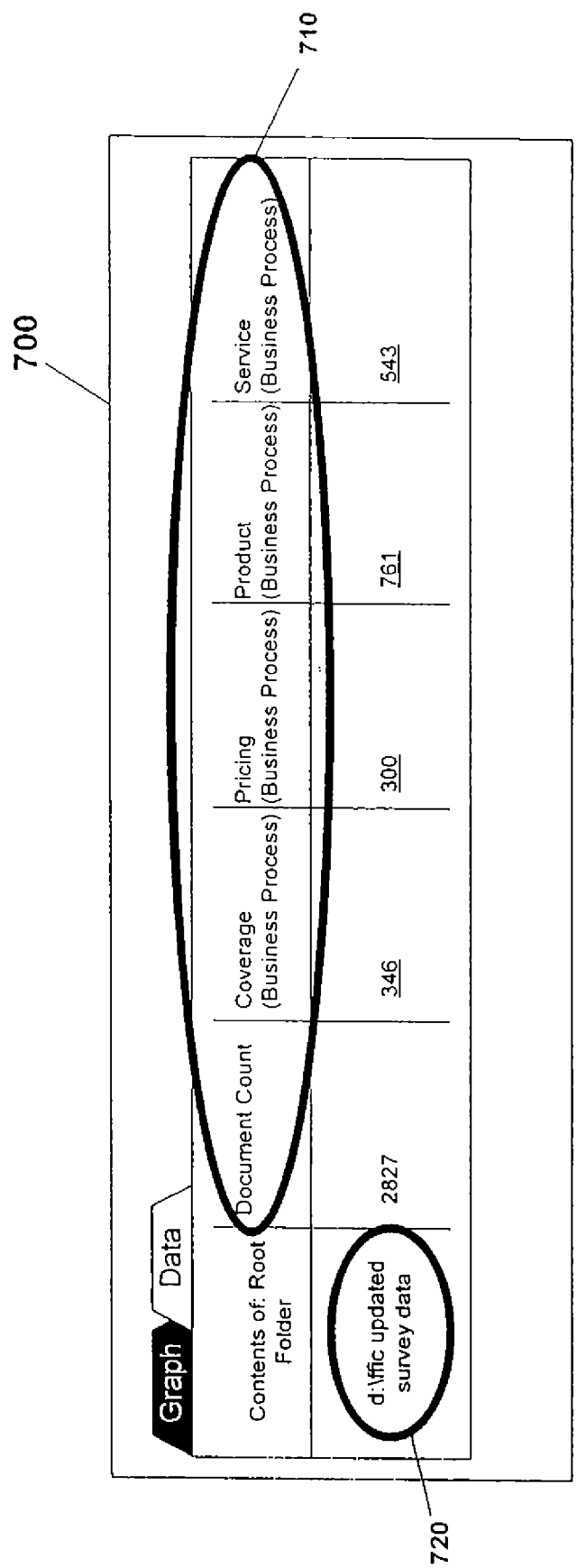
FIG. 7 shows a search results-concepts matrix in accordance with one embodiment of the invention.

By way of example, FIG. 7 shows a search results-concepts matrix 700 in accordance with one embodiment, which includes a first axis 710 and a second axis 720. The first axis 710 includes concepts such as 'coverage', 'pricing', 'products', and 'service', and the second axis 720 includes search results such as 'updated survey data'. The metric provided at the intersection of the first axis and the second axis pertains to a degree of presence (e.g., '346', '300', '761', and '543').

In another embodiment, the user terminal 130 may optionally display the relationship between a particular concept and the search results by showing sub-concepts associated with the particular concept on one axis (e.g., the first axis 710) and portions of the search results on another axis (e.g., the second axis 720). Additionally, the user terminal 130 may display the relationship of a particular sub-concept and the search results by showing child concepts to the particular sub-concept on one axis (e.g., the first axis 710) and portions of the search results on another axis (e.g., the second axis 720). Alternatively, the user terminal 130 may display the relationship between a particular portion of the search results and one or more concepts. One of skill in the art will appreciate the variations of drilling down into the search results-concepts matrix, including variations when the user terminal 130 shows the relationship between a particular concept and a particular portion of the search results.

In one embodiment of the invention, the user terminal 130 displays drilled-down versions of a search results-concepts matrix after a user "clicks" on a particular concept, portion of the search results, or intersection between a particular concept and a particular portion of the search results. One of skill in the art will appreciate alternative embodiments in which an algorithm displays drilled-down versions of a search results-concepts matrix without user intervention.

Figure 8:
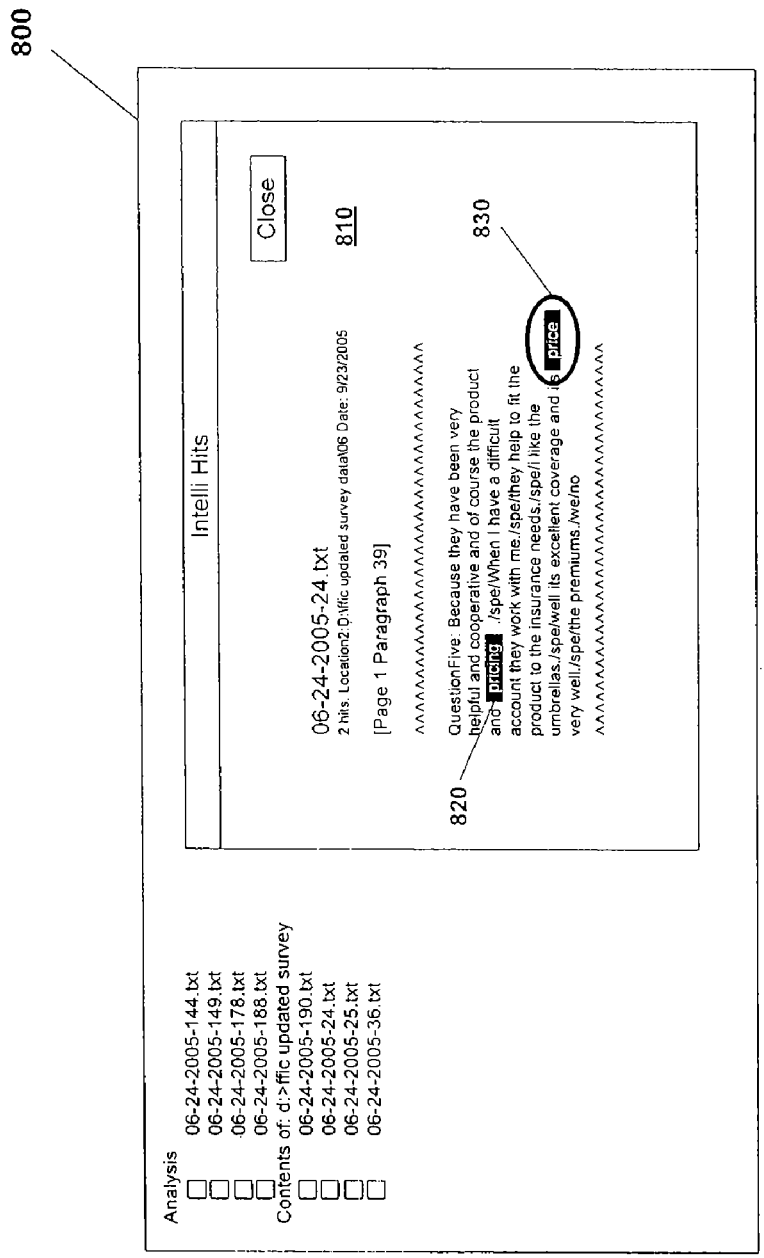
FIG. 8 shows a display depicting a particular portion of search results in accordance with one embodiment of the invention.

In some embodiments, the user terminal 130 may display particular portions of the search results with indications of the concepts therein. In accordance with one embodiment of the invention, FIG. 8 shows a display 800 depicting a particular portion of the search results 810 (e.g., '06-24-2005.txt') and indications 820 of a particular concept 830 (e.g., 'price/pricing') as that particular concept 830 pertains to the particular portion 810. In FIG. 8, the indications 820 are highlighted occurrences of the particular concept 830. One of skill in the art will appreciate alternative embodiments that include different indications.

In other embodiments, the user terminal 130 may display one or more relationships between two or more concepts, and/or between one or more concepts and structure elements in the searched content. Structure elements include grammatical elements such as periods, commas, hyphens, etc., as well as organizational elements such as headings, placement in a sentence, paragraph or section, and various other organization elements known in the art.

Figure 9:
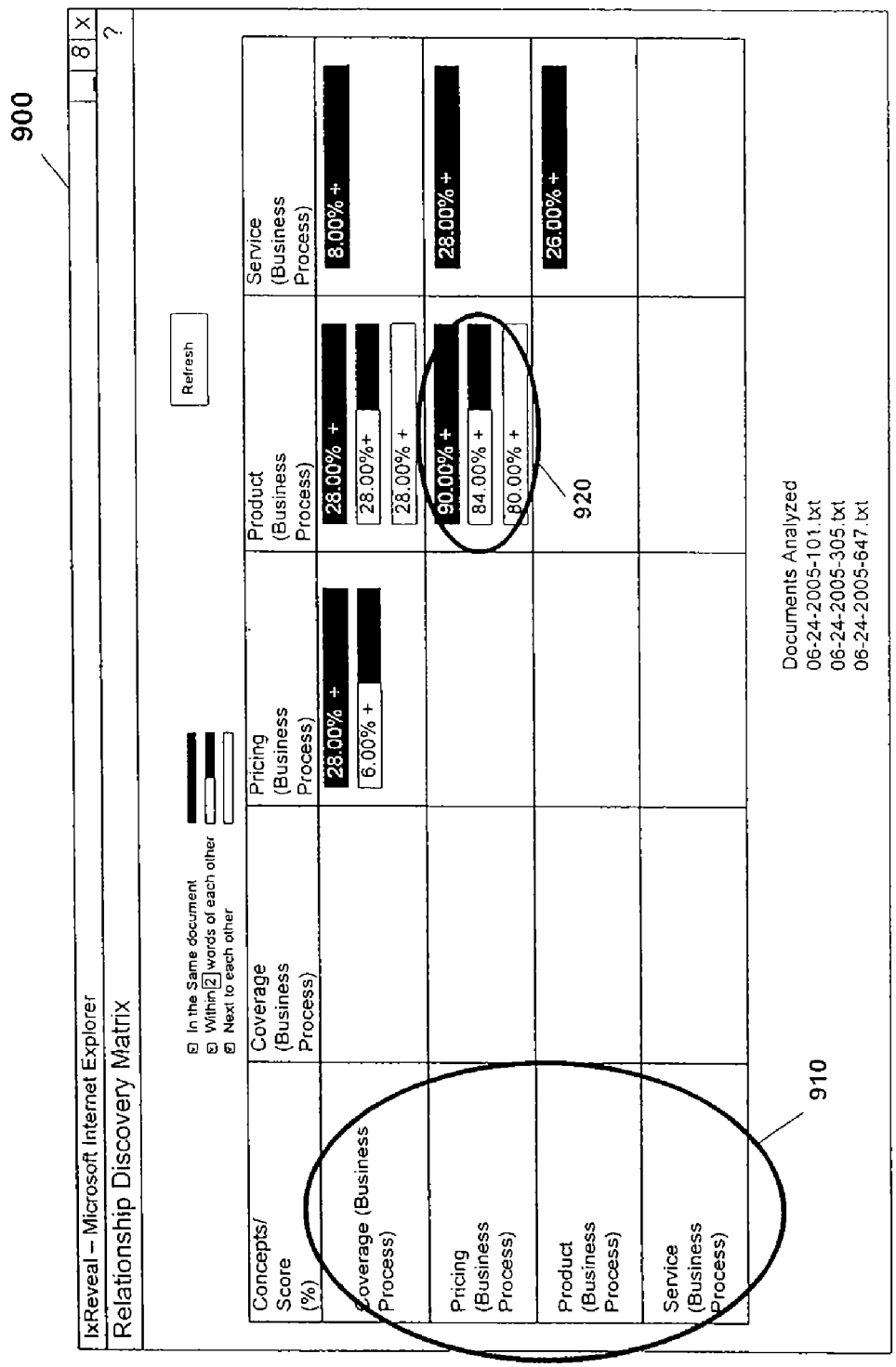
FIG. 9 shows a relationship discovery matrix in accordance with one embodiment of the invention.

By way of example, FIG. 9 shows a relationship discovery matrix 900 in accordance with one embodiment, which displays relationships between multiple concepts 910. The relationships in this case include 'In the Same document', 'Within 2 words of each other', and 'Next to each other'; however, one of skill in the art will appreciate alternative embodiments using other relationships. The matrix 900 displays, at a concept-concept intersection 920, the relationships between individual concepts associated with the intersection 920. The user terminal 130 may drill down at a particular concept-concept intersection 920 to display a more-detailed view of the relationships pertaining to the particular combination of concepts associated with that intersection 920.

In yet another embodiment, the user terminal 130 may display the search results using a game interface where one or more portions of the search results successively enter a user's screen and then eventually exit the user's screen. Additionally, the user terminal 130 may display a particular portion of the search results with an indication of that portion's relationship to one or more of the selected concepts. For example, the user terminal 130 may display a particular color that indicates relevance of a particular portion of the search results to one or more particular concepts. Optionally, the user terminal 130 may extract concepts from the portions of search results as they enter the user's screen. Moreover, the user terminal 130 may then subsequently display indications of the extracted concepts on the user's screen.

Figure 10:
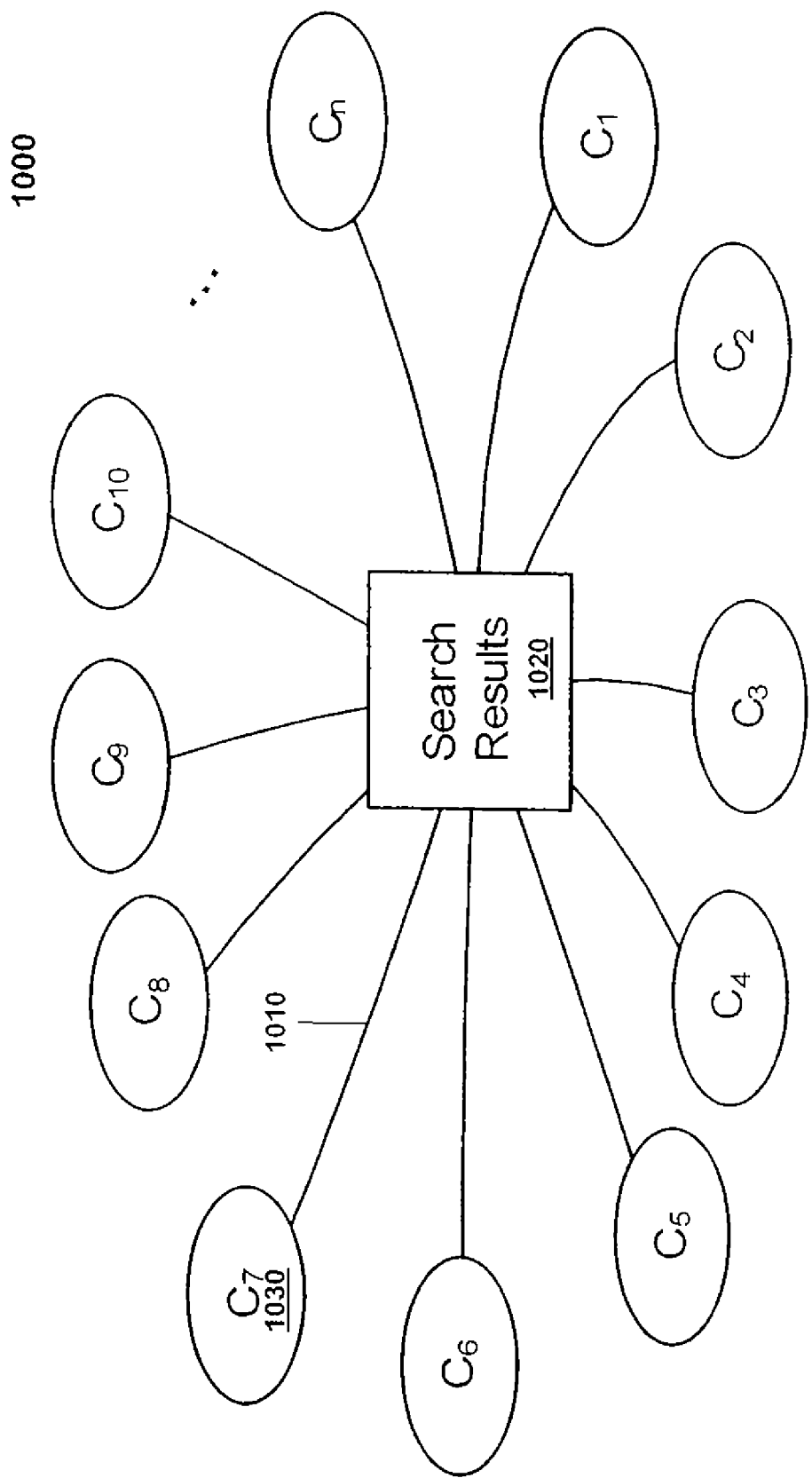
FIG. 10 shows a pictorial representation in accordance with one embodiment of the invention.
Figure 11:
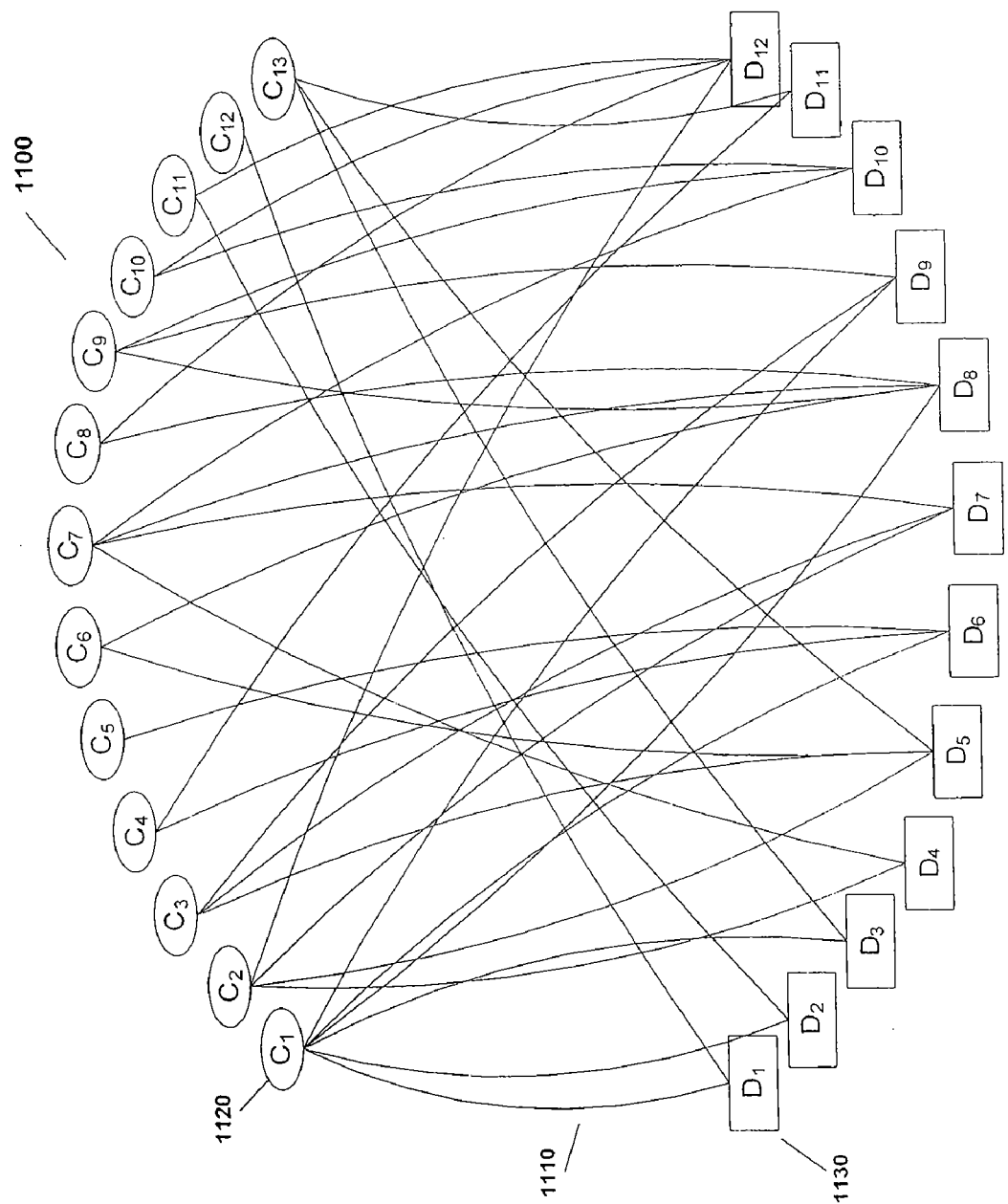
FIG. 11 shows a pictorial representation in accordance with one embodiment of the invention.
Figure 12:
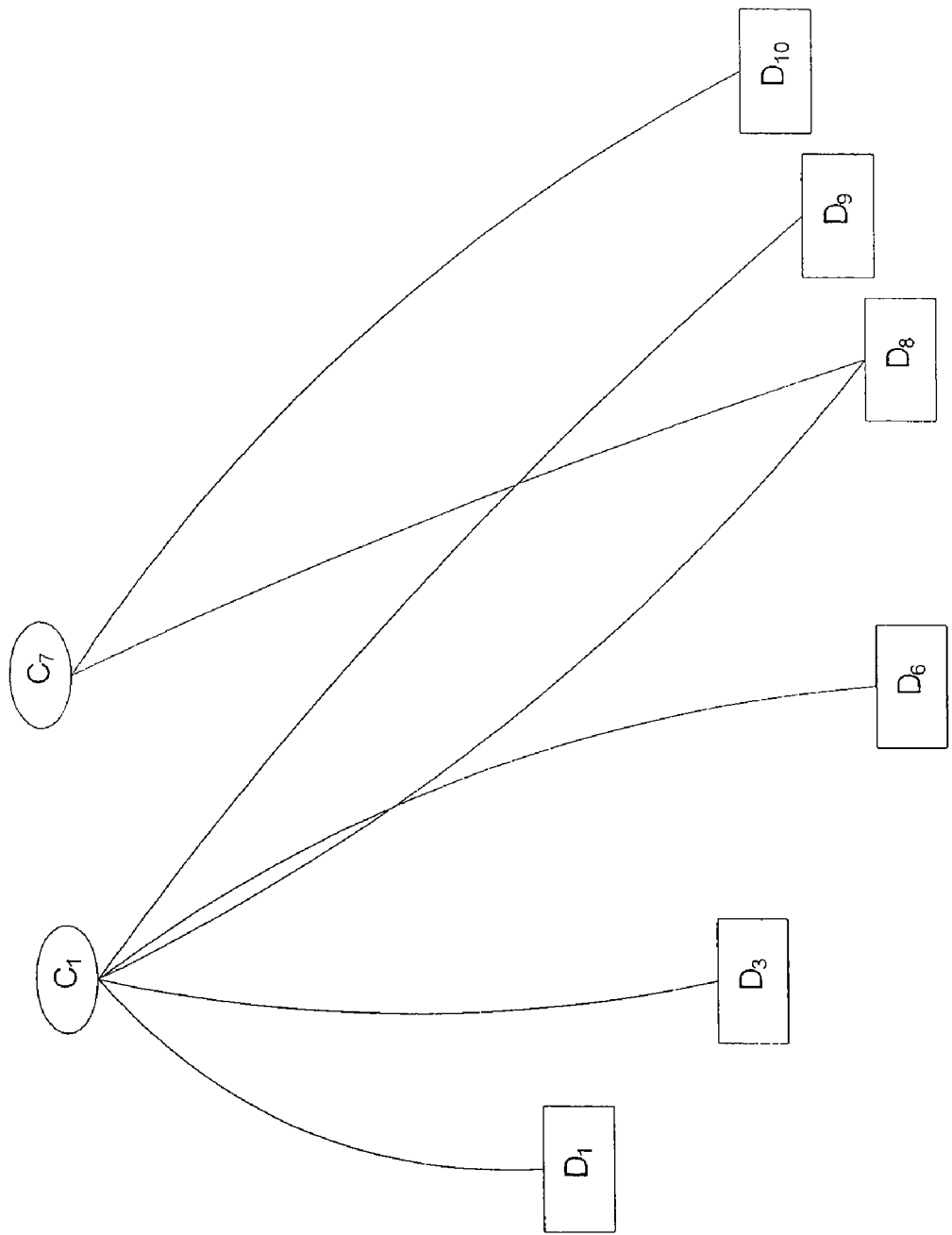
FIG. 12 shows a display depicting a particular portion of search results and/or concepts in accordance with one embodiment of the invention.

Still, in other embodiments the user terminal 130 may display the search results in the form of a graph, or in a pictorial representation. By way of example, FIG. 10 shows a pictorial representation 1000 in accordance with one embodiment of the invention, where an arc 1010 reflects a relationship (e.g., occurrence, proximity, relevancy, etc.) between search results 1020 and a concept 1030. By way of example, FIG. 11 shows a pictorial representation 1100 in accordance with one embodiment of the invention, where an arc 1110 that connects a concept 1120 and a portion of the search results 1130 indicates a relationship between the concept 1120 and the portion of the search results 1130. In other embodiments, the arc 1130 may be colored to indicate the extent of the relationship (e.g., occurrence, proximity, relevancy, etc.) between the concept 1120 and the portion of the search results 1130. In other embodiments, the user terminal 130 may display certain concepts, and/or display certain portions of the search results (as is shown in FIG. 12).

Figure 13:
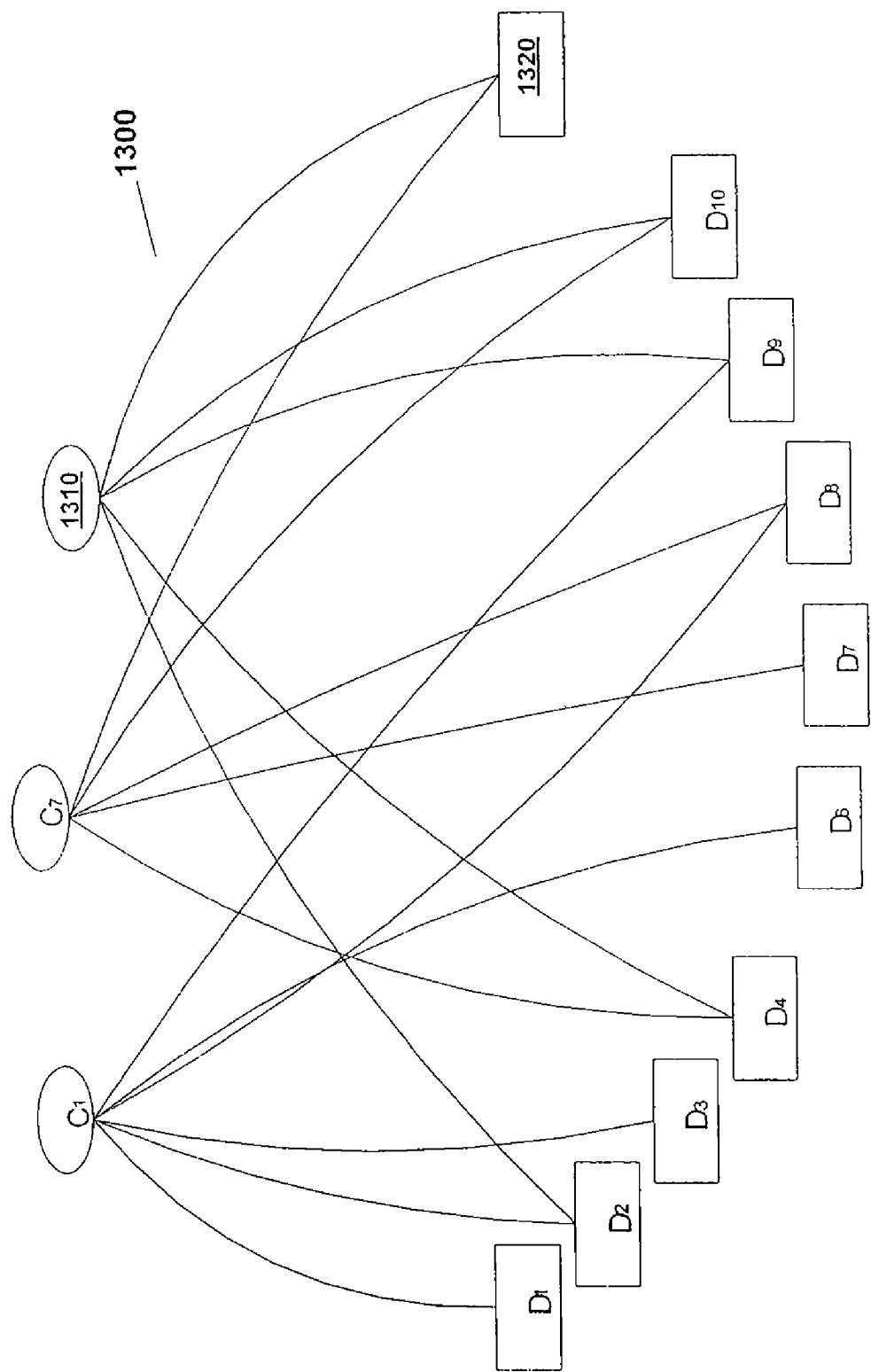
FIG. 13 shows a pictorial representation in accordance with one embodiment of the invention.

Still, in other embodiments the user terminal 130 may add a new concept to a pre-existing display. In this scenario, the user terminal 130 updates, based on the addition of the new concept, the relationships pertaining to the pre-existing concepts and the pre-existing search results in the pre-existing display. The user terminal 130 then creates a new display that combines the updates to the pre-existing concepts and the pre-existing search results with a representation of the new concept and its relationships to the pre-existing concepts and/or pre-existing search results. It is also possible for the user terminal 130 to add new content to a pre-existing display via a method similar to the one described above with respect to adding a new concept. By way of example, FIG. 13 shows a pictorial representation 1300 of search results in accordance with one embodiment where a new concept 1310 has been added to a pre-existing display, and where new content 1320 has been added to the pre-existing display.

As shown in FIG. 6, the user terminals 130 and 140 may optionally share search results, analysis, and/or concepts (step 630). Sharing in such a manner may be accomplished via any number of ways, such as email, website uploads/downloads (e.g., from a web portal), virtual folders, and secure databases, among others known in the art. One advantage of this aspect of the invention is the increased efficiency and effectiveness of a search conducted by the user terminal 130. By sharing search results, analysis, and/or concepts, the user terminal 130 can leverage the previous work of other user terminals 140, and apply the previous work in a search scope that is relevant to the user terminal 130.

Additionally, another aspect of the invention allows a user terminal 130 to conduct searches based on a profile of a user in communication with the user terminal 130 or another user terminal 140. For example, a profile may store information pertaining to interests of a user, characteristics of a user (e.g., spending habits, historical searches, etc.), preferences of a user regarding particular types of sources for retrieving search results, among others. Profiles may capture user emotional preferences, cognitive ability, personal experience, educational level, etc. The user terminal 130 may form a profile of a user. For example, the user terminal 130 may form a user profile by reviewing the concept bank(s) a user has accessed during a given time period.

FIG. 6 also indicates that the user terminal 130 may analyze search results with additional concepts and/or modified selected concepts (step 640). By adding concepts and/or modifying selected concepts, the user terminal 130 is able to search within search results, thereby narrowing the search results and/or viewing the search results from one or more different perspectives. Alternatively, this aspect of the invention allows the user terminal 130 to expand the search results by adding new concepts and/or modifying definitions of the selected concepts. Once the new and/or modified concepts are identified, the user terminal 130 may search for additional content to be added to or replace the search results.

According to FIG. 6, the user terminal 130 may combine additional content with any portion of the search results (step 650*a*), and then analyze the combined content and search results (step 650*b*).

As shown in FIG. 6, the user terminal 130 may also create and/or modify text, data, images and/or other suitable content based on search results, analysis and/or concepts (step 660). In one embodiment, the user terminal 130 identifies potential concepts of interest (step 660*a*). For example, the user terminal 130 may accomplish step 660*a* by extracting concepts from text, data, images and/or other suitable content that may contain one or more concepts. One example of a concept extraction procedure may be found in patent application Ser. No. 10/695,426, entitled "Concept-Based Method and System for Dynamically Analyzing Results from Search Engines," filed on Oct. 29, 2003, which is incorporated herein by reference and which is a continuation in part of patent application Ser. No. 10/677,492, entitled "System and Method for Concept Based Analysis of Unstructured Data," filed on Oct. 3, 2003, which is incorporated herein by reference and which is a continuation in part of patent application Ser. No. 10/393,677, entitled "Concept-Based Method and System for Dynamically Analyzing Unstructured Information and Providing Trends and Exceptions Tracking Capabilities," filed on Mar. 19, 2003, which is incorporated herein by reference and which is a continuation in part of U.S. Pat. No. 6,970,881, entitled "Concept-Based Method and System for Dynamically Analyzing Unstructured Information." filed on Mar. 1, 2002, which is incorporated herein by reference and which claims priority to provisional application No. 60/302, 971, filed on May 5, 2001, which is incorporated herein by reference; however, one of skill in the art will appreciate that alternative extraction algorithms may be used to extract concepts automatically from the selected data and/or text.

One aspect of the invention allows the user terminal 130 to identify concepts that are relevant to a particular perspective of the user terminal 130 or a user in communication with the user terminal 130. In one embodiment, the user terminal 130 may extract concepts from content by relating the content to concepts stored in particular databases (e.g., internal or external concept bank(s) of one or more certain perspectives). In this manner, the types of concepts identified by the user terminal 130 reflect one or more of a plurality of a specific views.

The user terminal 130 may alternatively extract concepts from text, data, images, and/or other suitable content while that content is being added to, subtracted from, and/or modified by various other methods. Under scenarios where concepts within the text, data, images, etc., change due to the one or more modifications, the user terminal 130 will recognize the changes and update the extracted concepts accordingly. By way of example, the user terminal 130 may extract a first identified concept from content while a user in communication with the user terminal 130 is adding more information to the content. After the user has added more information to the content, the user terminal 130 may determine that a second identified concept more-accurately reflects the content in its expanded form, and that the first identified concept is less relevant or no longer relevant to the expanded content. Alternatively, the user terminal 130 may, without user intervention, extract concepts from content that the user terminal 130 is modifying.

Additionally, in some embodiments, the user terminal 130 may accomplish step 660a by receiving user-specified concepts. In such an embodiment, the user terminal 130 may identify one or more concepts specified by a user in communication with the user terminal 130. The user terminal 130 may additionally receive, from the user, a specified organizational structure (e.g., an outline, hierarchy, etc.) that determines how each concept and context related to each concept will be displayed with respect other concepts and context. Alternatively, the user terminal 130 may determine one or more possible organizational structures based on the relationships of the concepts to one another. Under this scenario, the user terminal 130 may present the one or more possible organizational structures for user selection, or may use all or a portion of the one or more organizational structures individually without user selection. Additionally or alternatively, the user terminal 130 may identify concepts that were not received from the user, and then add those concepts, automatically or after user authorization, to the one or more organizational structures.

As shown at step 660b, the user terminal 130 may display one or more of the identified concepts and/or information associated with the one or more identified concepts.

Figure 14:
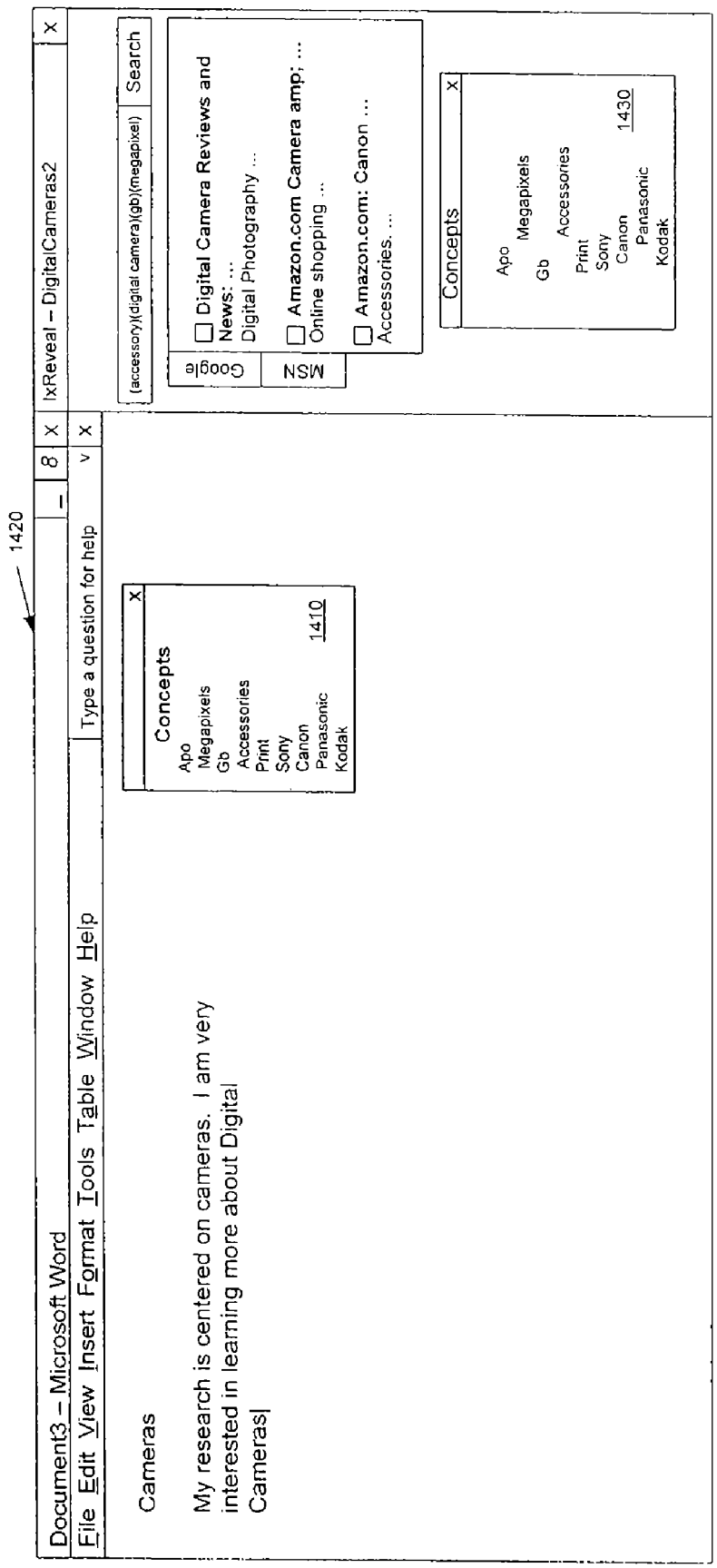
FIG. 14 shows a display depicting concepts to a user via a pop-up window in accordance with one embodiment of the invention.

For example, as shown in FIG. 14, the user terminal 130 may display concepts to a user via a pop-up window 1410 on the user's screen 1420. Alternatively, the user terminal 130 may display concepts via a less-obtrusive application window 1430 on the user's screen 1420.

After the user terminal 130 displays an identified concept, the user may copy and paste, into content accessible by the user (e.g., a document, an email, a webpage, or any other computer tool that conveys information), a portion or all of the concept and/or information associated with the concept. Alternatively, the user may manually enter, into content accessible by the user, a portion or all of the concept and/or information associated with the concept. In an alternative embodiment, the user may select a displayed concept (e.g., by single or double "clicking" on the displayed concept) and a portion or all of the concept, along with information associated with the concept, will be imported into content specified by the user.

In another embodiment, the user may select a displayed concept (e.g., by single or double "clicking" on the displayed concept) for a detailed review of its meaning and/or information associated with the concept. In this manner, the user is able to confirm that the displayed concept is applicable to the interests of the user. Alternatively, the user terminal 130 may automatically confirm applicability of the displayed concept.

In alternative embodiments, the user terminal 130 may automatically, or after user authorization, import a portion or all of an identified concept and/or information associated with the concept into content (e.g., a document, an email, a webpage, or any other computer tool that is capable of conveying information). The content to which a portion/all of the identified concept/information associated with the concept is imported may or may not be content from which the identified concept was identified.

As shown in step 660c, the user terminal 130 may administer a search based on one or more of the concepts identified by the user terminal 130. In one embodiment, the user terminal 130 automatically conducts a search based on an identified concept. In an alternative embodiment, the user terminal 130 conducts a search based on an identified concept after user selection of that concept (e.g., by single or double "clicking" on the displayed concept). Search techniques similar to those described above with respect to FIG. 2 may be used during step 660c. One of skill in the art will appreciate alternative search techniques that may be used during step 660c.

As shown at step 660d, the user terminal 130 may display results from a search that was based on an identified concept. The search results may include, among other things, context associated with the identified concept.

Figure 15:
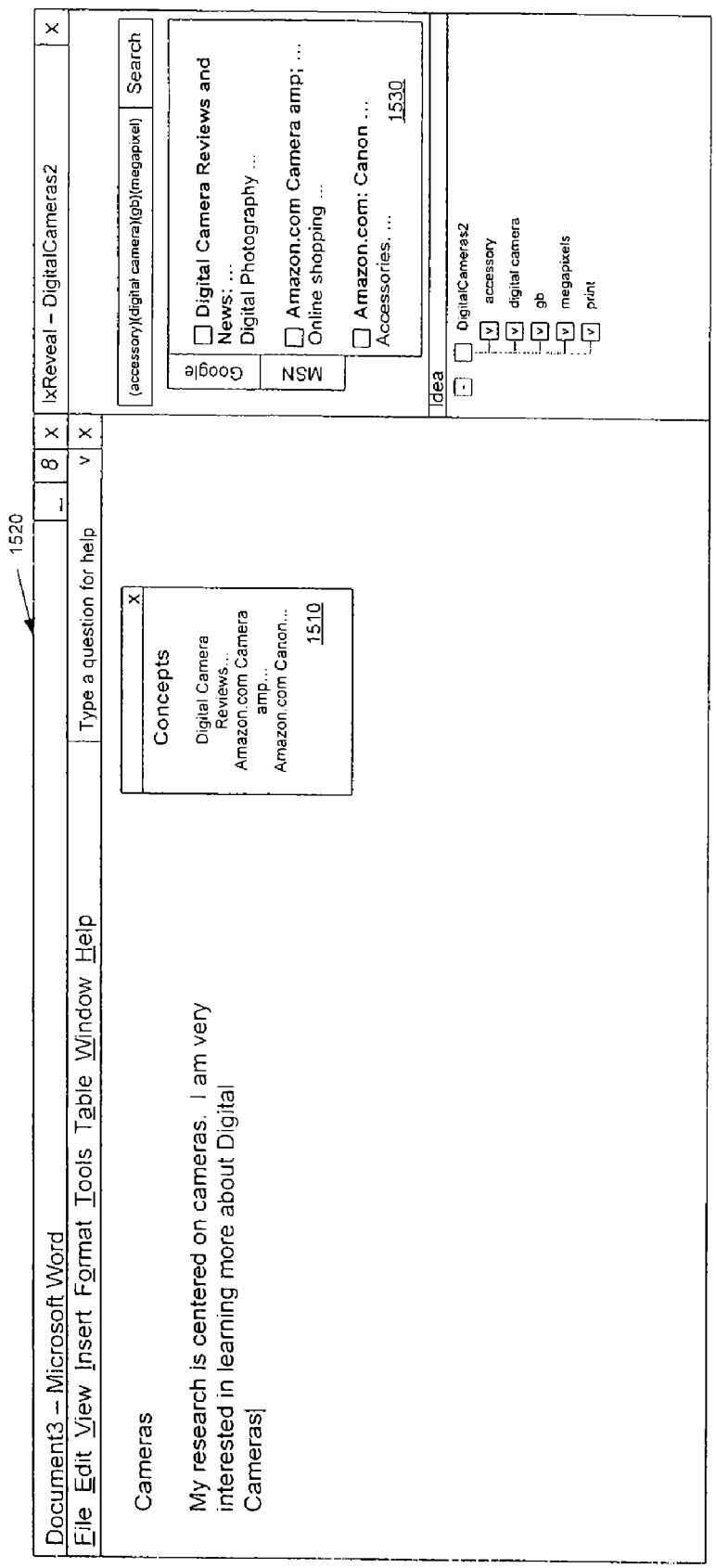
FIG. 15 shows a display depicting search results to a user via a pop-up window in accordance with one embodiment of the invention.

As shown in FIG. 15, the user terminal 130 may display search results to a user via a pop-up window 1510 on the user's screen 1520. Alternatively, the user terminal 130 may display search results via a less-obtrusive application window 1530 on the user's screen 1520.

After the user terminal 130 displays a search result, the user may copy and paste, into content accessible by the user (e.g., a document, an email, a webpage, or any other computer tool that conveys information), a portion or all of the search result. Alternatively, the user may manually enter, into content accessible by the user, a portion or all of the search result. In an alternative embodiment, the user may select a displayed search result (e.g., by single or double "clicking" on the displayed search result) and a portion or all of the search result will be imported into content specified by the user.

In another embodiment, the user may select a displayed search result (e.g., by single or double "clicking" on the displayed search result) for a detailed review of its contents. In this manner, the user is able to confirm that the displayed search result is applicable to the interests of the user.

In alternative embodiments, the user terminal 130 may automatically, or after user authorization, import a portion or all of a search result into content (e.g., a document, an email, a webpage, or any other computer tool that is capable of conveying information). The content to which a portion or all of the search result is imported may or may not be content from which an identified concept, of which formed the basis for the imported search result, was identified.

As mentioned above, a search result may contain context associated with a concept. For example, in cases where a search result returns a large amount of information or when a concept is scattered throughout a search result, it may be necessary to summarize the search result in order to capture the true context associated with the concept.

Figure 16:
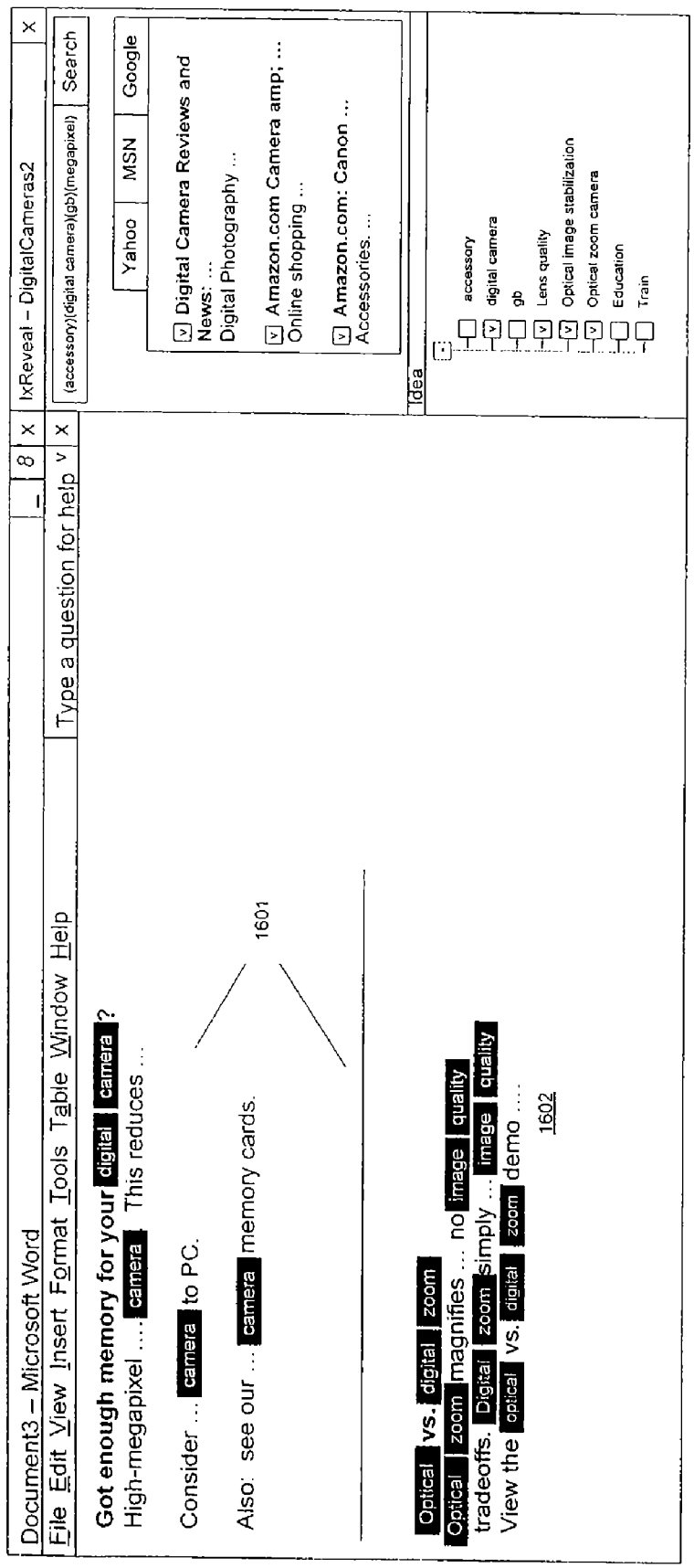
FIG. 16 illustrates a computer interface that displays summarized portions of search results after those portions have been imported into content.
Figure 17:
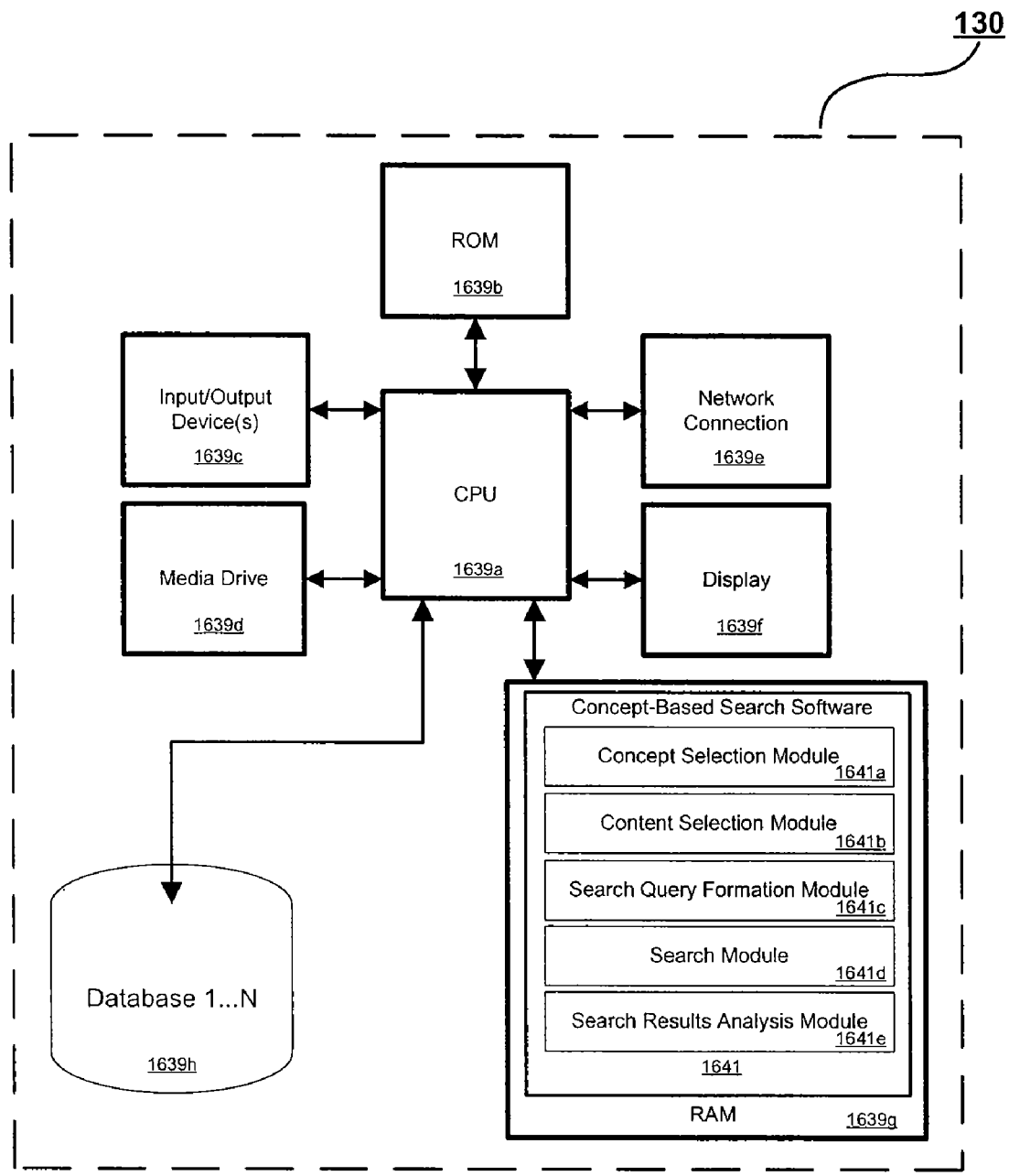
FIG. 17 depicts an implementation of a user terminal in accordance with one embodiment of the invention.

In one embodiment, the user terminal 130 summarizes the search result by extracting a portion of the search result immediately before and after one or more of the occurrence(s) of a concept in thIn one embodiment, the user terminal 130 summarizes the search result by extracting a portion of the search result immediately before and after one or more of the occurrence(s) of a concept in the search result. In one embodiment, a user in communication with the user terminal 130 may configure the size of this portion of the search result. For example, the portion may be set at n words, sentences, paragraphs, etc. By way of example, FIG. 16 illustrates a computer interface that displays summarized portions 1601 of search results after those portions have been imported into content 1602 (e.g., a Word document).

In another embodiment, the user terminal 130 may extract concepts within a search result and/or apply additional concepts to the search result, and then use those extracted/applied concepts to summarize the context associated with the concept on which the search result was based. Alternatively, the user terminal 130 may determine the context associated with the concept on which the search result was based by interpreting the grammar structure within a specified proximity of the concept in the search result. One of skill in the art will appreciate alternative embodiments that allow a search result to be summarize in the context of a concept within the search result.

At step 660e, the user terminal 130 may extract concepts from content that has been created. Techniques for extracting concepts similar to those described above may be used during step 660e.

FIG. 6 also indicates that the user terminal 130 may also select data and/or text, via user input or an algorithm, from the search results, and then extract one or more concepts from the selected data and/or text (step 670a). The user terminal 130 may additionally import any the extracted concepts to a concept bank for storage, subsequent use, and/or sharing (step 670b). The user terminal 130 may additionally extract one or more additional concepts and/or sub-concepts from newly-extracted concepts and/or previously-stored concepts. For example, additionally-extracted concepts may include a relationship between a concept and the content in which that concept occurs. Alternatively, additionally-extracted concepts may include a relationship between two concepts. The user terminal 130 may also modify the additionally-extracted concepts and/or any other concepts (step 670d).

According to some embodiments of the invention, the user terminal 130 may analyze one or more portions of search results by applying search operators similar to those discussed with respect to step 240 of FIG. 2 (step 680). One advantage of this aspect of the invention is that the user terminal 130 may "mine" the search results at any time based on different viewpoints.

Implementation of Concept-Based Searching Via Computer Product

Aspects of the invention may be described in the general context of computer-executable instructions, such as program modules, being executed by a computer or server. Generally, program modules include routines, programs, objects, components, data structures, and the like that perform particular tasks or implement particular abstract data types. The exemplary systems and methods of the invention have been described above with respect to the user terminal 130. One of skill in the art will appreciate embodiments of the invention wherein the functions of the user terminal 130 are performed via computer executable instructions.

Attention is now drawn to FIG. 16, which depicts an exemplary implementation of the user terminal 130. The implementation depicted in FIG. 16 includes a processor 1639a coupled to ROM 1639b, input/output devices 1639c (e.g., a keyboard, mouse, etc.), a media drive 1639d (e.g., a disk drive, USB port, etc.), a network connection 1639e, a display 1639f, a memory 1639g (e.g., random access memory (RAM)), and a file storage device 1639h.

The storage device 1639h is described herein in several implementations as hard disk drive for convenience, but this is certainly not required, and one of ordinary skill in the art will recognize that other storage media may be utilized without departing from the scope of the invention. In addition, one of ordinary skill in the art will recognize that the storage device 1639h, which is depicted for convenience as a single storage device, may be realized by multiple (e.g., distributed) storage devices.

As shown, a concept-based search software application 1641 includes a Concept Selection module 1641a, a Content Selection module 1641b, a Search Query Formation module 1641c, a Search module 1641d, and a Search Results Analysis module 1641e, which are implemented in software and are executed from the memory 1639g by the processor 1639a. The software 1641 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the invention.

Each module 1641a-e is associated with one or more of the steps described above with respect to FIGS. 2-6. For example, the Concept Selection module 1641a pertains to steps 210 and 311-315, the Content Selection module 1641b pertains to step 220, the Search Query Formation module 1641c pertains to steps 230 and 431-434, the Search module 1641d pertains to steps 240-250, and the Search Results Analysis module 1641e pertains to steps 260, 561-566 and 610-680.

For a complete review of the implementations applicable to certain embodiments of the present invention, see patent application Ser. No. 10/695,426, entitled "Concept-Based Method and System for Dynamically Analyzing Results from Search Engines," filed on Oct. 29, 2003, which is incorporated herein by reference and which is a continuation in part of patent application Ser. No. 10/677,492, entitled "System and Method for Concept Based Analysis of Unstructured Data," filed on Oct. 3, 2003, which is incorporated herein by reference and which is a continuation in part of patent application Ser. No. 10/393,677, entitled "Concept-Based Method and System for Dynamically Analyzing Unstructured Information and Providing Trends and Exceptions Tracking Capabilities," filed on Mar. 19, 2003, which is incorporated herein by reference and which is a continuation in part of U.S. Pat. No. 6,970,881, entitled "Concept-Based Method and System for Dynamically Analyzing Unstructured Information," filed on Mar. 1, 2002, which is incorporated herein by reference and which claims priority to provisional application No. 60/302,971, filed on May 5, 2001, which is incorporated herein by reference.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method, comprising:
   receiving from a first user a first search query;
   providing a first set of one or more search results including identification of a plurality of content items responsive to the first search query;
   forming a concept hierarchy based at least in part on one or more concepts, each concept from the one or more concepts being based on a meaning extracted from at least one content item from the plurality of content items and comprising at least one of:
      a word;
      an image;
      a number;
      a symbol;
      an idea;
      a meaning in a context; or
      a relationship between two or more of:
         a word;
         an image;
         a number;
         a symbol;
         a document; or
         a data set;
   revising, in response to user input, at least a portion of the concept hierarchy, the revising including at least one of:
      deleting a first user-selected concept from the concept hierarchy;
      inserting a first user-defined concept into the concept hierarchy; and
      revising a relationship between a second user-selected concept and a third user-selected concept in the concept hierarchy;
   forming a second search query based at least in part on one or more of:
      the first user-defined concept;
      the first user-selected concept if not previously deleted;
      the second user-selected concept,
      the third user-selected concept; and
      a fourth user-selected concept from the concept hierarchy;
   providing a second set of one or more search results responsive to the second search query;
   storing unstructured analysis created by the first user and received from the first user, the unstructured analysis being based on at least one of:
      the concept hierarchy; and
      at least a portion of the second set of one or more search results; and
   providing to a second user:
      at least a portion of the second set of one or more search results; and
      the unstructured analysis,
   wherein at least one of the receiving, providing a first set, forming a concept hierarchy, revising, forming a second search query, providing a second set, storing and providing to a second user is performed at a processor.

2. The method of claim 1, further comprising:
   extracting from each content item from the plurality of content items a portion of that content item associated with at least one instance of a fifth user-selected concept; and
   creating a text file including at least the portions and a listing of that content item corresponding to each portion.

3. The method of claim 1 wherein the forming the concept hierarchy includes:
   identifying one or more concepts in the first search query;
   identifying one or more content items from the plurality of content items in which a concept from the one or more concepts is present; and
   forming the concept hierarchy based at least in part on the one or more concepts.

4. The method of claim 1 wherein the concept hierarchy includes one or more levels of concepts and subconcepts, further comprising:
   displaying to an output device a visual representation of the concept hierarchy that includes a visual representation of the one or more levels of concepts and subconcepts.

5. The method of claim 1 wherein the forming the second search query includes:
   converting the second search query into a first form compatible with a first search engine;
   converting the second search query into a second form compatible with a second search engine;
   submitting the second search query in the first form to the first search engine; and
   submitting the second search query in the second form to the second search engine.

6. The method of claim 1, further comprising:
   providing to a third user at least a portion of the second set of one or more search results in a database accessible over a network.

7. The method of claim 1, further comprising:
   providing to a third user at least a portion of the second set of one or more search results in a downloadable file.

8. The method of claim 1, wherein the providing to the second user includes receiving user authentication information, verifying the user authentication information, and displaying to a screen the portion of the second set of one or more search results and the unstructured analysis.

9. The method of claim 1, further comprising:
   providing to a display the second set of one or more search results.

10. The method of claim 1, further comprising:
   sending the second set of one or more search results to a third user via electronic mail.

11. A method, comprising:
   submitting a first signal that includes a first search query by a first user;
   receiving:
      a first set of one or more search results including identification of a plurality of content items responsive to the first search query; and
      a concept hierarchy based at least in part on one or more concepts, each concept from the one or more concepts being based on a meaning extracted from at least one content item from the plurality of content items and comprising at least one of:
         a word;
         an image;
         a number;
         a symbol;

an idea;
a meaning in a context; or
a relationship between two or more of:
  a word;
  an image;
  a number;
  a symbol;
  a document; or
  a data set;
submitting a second signal indicating a desired revision to at least a portion of the concept hierarchy, the second signal including an instruction to perform at least one of:
  deleting a first user-selected concept from the concept hierarchy;
  inserting a first user-defined concept into the concept hierarchy; and
  revising a relationship between a second user-selected concept and a third user-selected concept in the concept hierarchy;
submitting a third signal that includes a second search query based at least in part on one or more of:
  the first user-defined concept;
  the first user-selected concept if not previously deleted;
  the second user-selected concept;
  the third user-selected concept; and
  a fourth user-selected concept from the concept hierarchy;
receiving a second set of one or more search results responsive to the second search query; and
sending to a second user:
  at least a portion of the second set of one or more search results; and
  unstructured analysis created by the first user on at least one of:
    the concept hierarchy; and
    a portion of the second set of one or more search results, wherein at least one of the submitting a first signal, receiving a first set, submitting a second signal, submitting a third signal, receiving a second set and sending to a user is performed at a processor.

12. The method of claim 11 wherein the submitting the first signal includes submitting the first search query to a search engine, further comprising:
  selecting the search engine from among a plurality of search engines.

13. The method of claim 12 wherein the search engine is a first search engine and the submitting the second signal includes submitting the second search query to a second search engine different from the first search engine.

14. The method of claim 11 wherein the submitting the first signal includes submitting the first search query to a search engine, further comprising:
  specifying through text input addressing information of the search engine.

15. The method of claim 11 wherein the second search query is based at least in part on a user-created profile including at least one of:
  user preferences;
  user education information;
  preferred user search engines; and
  user interests.

16. The method of claim 11 wherein each concept from the one or more concepts represents an idea or meaning in a context.

17. The method of claim 11 wherein the signal indicating a desired revision to at least a portion of the concept hierarchy further includes a signal to revise a definition of the first user-selected concept.

* * * * *